(12) United States Patent
Shimizu et al.

(10) Patent No.: US 10,574,478 B2
(45) Date of Patent: Feb. 25, 2020

(54) INFORMATION PROCESSING SYSTEM, METHOD, AND APPARATUS

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/009,260

(22) Filed: Jun. 15, 2018

(65) Prior Publication Data

US 2018/0375683 A1 Dec. 27, 2018

(30) Foreign Application Priority Data

Jun. 27, 2017 (JP) .................................. 2017-125356

(51) Int. Cl.
| | |
|---|---|
| *H04L 12/44* | (2006.01) |
| *H04L 12/24* | (2006.01) |
| *H04L 12/761* | (2013.01) |
| *H04L 12/753* | (2013.01) |
| *H04L 12/707* | (2013.01) |

(52) U.S. Cl.
CPC .............. *H04L 12/44* (2013.01); *H04L 41/12* (2013.01); *H04L 45/16* (2013.01); *H04L 45/22* (2013.01); *H04L 45/48* (2013.01)

(58) Field of Classification Search
CPC ......... H04L 12/44; H04L 41/12; H04L 45/16; H04L 45/22; H04L 45/48
USPC ................................................. 370/255–256
See application file for complete search history.

(56) References Cited

U.S. PATENT DOCUMENTS

| 7,984,448 B2 * | 7/2011 | Almasi ..................... G06F 9/54 712/35 |
| 2012/0300669 A1 * | 11/2012 | Zahavi .................. H04L 45/124 370/254 |
| 2013/0022047 A1 * | 1/2013 | Nakashima ............. H04L 49/65 370/392 |
| 2015/0256451 A1 * | 9/2015 | Nakashima ............. H04L 45/48 370/389 |

(Continued)

OTHER PUBLICATIONS

Acceleration of All-to-All Communication in Latin Square Fat-Tree, Low Cost Scalable Network Topology (Year: 2016).*

(Continued)

*Primary Examiner* — Candal Elpenord
(74) *Attorney, Agent, or Firm* — Fujitsu Patent Center

(57) ABSTRACT

An information processing system includes Spine switches, Leaf switches coupled to the Spine switches in a form of a Latin square fat tree, and apparatuses each coupled to any one of the Leaf switches and including a processor. The processor performs, in a case where the processor is included in one of first apparatuses coupled to one of first Leaf switches, first collective communication with others of the first apparatuses on a route via a first Spine switch. The first Leaf switches correspond to at least a portion of points other than points at infinity of a finite projective plane corresponding to the Latin square fat tree. The processor performs second collective communication with others of the first apparatuses on a route via a second Spine switch at each phase of the first collective communication. The second Spine switch is different from the first Spine switch.

12 Claims, 45 Drawing Sheets

(56) References Cited

U.S. PATENT DOCUMENTS

| | | | |
|---|---|---|---|
| 2016/0014049 A1* | 1/2016 | Zahid | H04L 45/48 |
| | | | 709/226 |
| 2016/0301565 A1* | 10/2016 | Zahid | H04L 41/0672 |
| 2017/0026461 A1* | 1/2017 | Boutros | H04L 67/101 |
| 2017/0187614 A1* | 6/2017 | Haramaty | H04L 45/48 |
| 2017/0212778 A1* | 7/2017 | Johnsen | H04L 61/6045 |
| 2017/0214600 A1* | 7/2017 | Moxnes | G06F 9/451 |

OTHER PUBLICATIONS

M. Valerio et al., "Recursively Scalable Fat-Trees as Interconnection Networks", IEEE 13th Annual International Phoenix Conference on Computers and Communications, pp. 40-46 (7 pages) 1994.

* cited by examiner

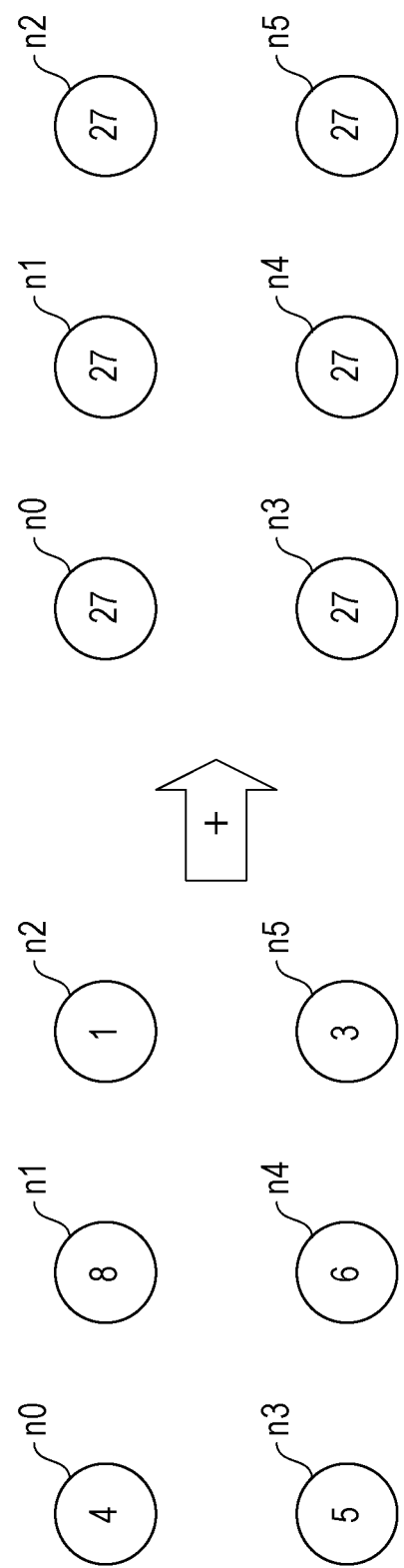

FIG. 3A
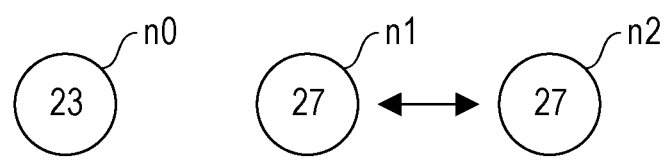
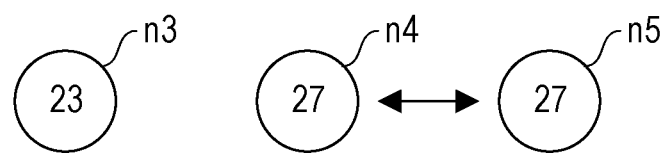
FIG. 3B
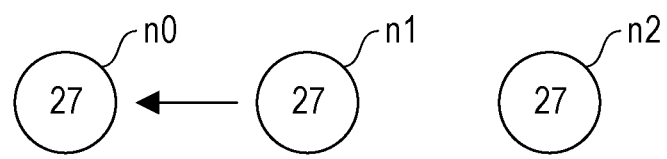
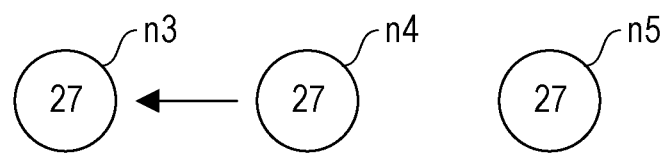

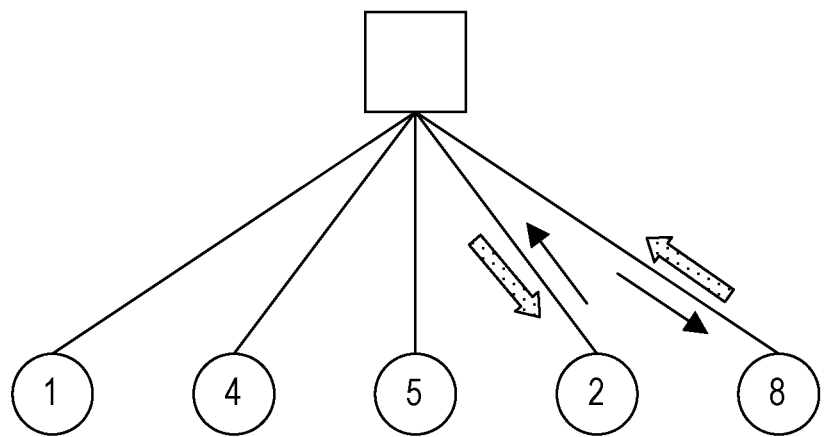
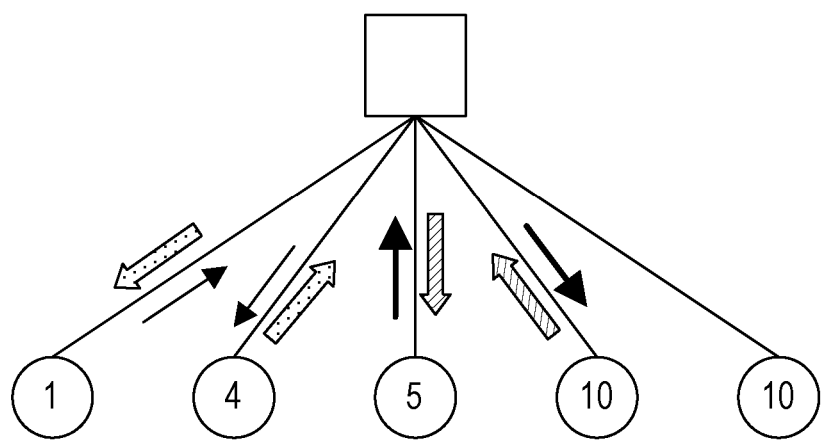

FIG. 20

| PHASE NUMBER | COMMUNICATION 1 | COMMUNICATION 2 | ... |
|---|---|---|---|
| 0 | (N4, N5) |  | ... |
| 1 | (N1, N2) | (N3, N4) | ... |
| 2 | (N1, N3) | (N2, N4) | ... |
| 3 | N4 -> N5 |  | ... |

FIG. 22

| PHASE GROUP | PHASE NUMBER | SERVER NUMBER | |
| --- | --- | --- | --- |
| | | 0 | 1 |
| 0 | 0 | [∞, 1] | [2, 1] |
| | 1 | | |
| 1 | 2 | [∞, 2] | [*] |
| | 3 | | |
| 2 | 4 | [0, 1] | [∞, 1] |
| | 5 | | |
| 3 | 6 | [1, 1] | [∞, 2] |
| | 7 | | |
| 4 | 8 | [2, 1] | [0, 1] |
| | 9 | | |
| 5 | 10 | [*] | [1, 1] |
| | 11 | | |

→ ALL-TO-ALL COMMUNICATION OF SERVER "0"
--→ ALL-TO-ALL COMMUNICATION OF SERVER "1"

→ ALL-TO-ALL COMMUNICATION OF SERVER "0"

┄→ ALL-TO-ALL COMMUNICATION OF SERVER "1"

FIG. 29

| PHASE GROUP | ALL-TO-ALL | | ALLREDUCE |
|---|---|---|---|
| 0 | ∞(1) | 2(1) | 0 |
| 1 | ∞(2) | * | 0 |
| 2 | 0(1) | ∞(1) | - |
| 3 | 1(1) | ∞(2) | 0 |
| 4 | 2(1) | 0(1) | ∞ |
| 5 | * | 1(1) | ∞ |

FIG. 31

| PHASE GROUP | ALL-TO-ALL | | ALLREDUCE |
|---|---|---|---|
| 1 | ∞(1) | 3(2) | 0 |
| 2 | ∞(2) | 4(1) | 0 |
| 3 | ∞(3) | 4(2) | 0 |
| 4 | ∞(4) | * | 0 |
| 5 | 0(1) | ∞(1) | – |
| 6 | 0(2) | ∞(2) | – |
| 7 | 1(1) | ∞(3) | 0 |
| 8 | 1(2) | ∞(4) | 0 |
| 9 | 2(1) | 0(1) | ∞ |
| 10 | 2(2) | 0(2) | ∞ |
| 11 | 3(1) | 1(1) | ∞ |
| 12 | 3(2) | 1(2) | ∞ |
| 13 | 4(1) | 2(1) | ∞ |
| 14 | 4(2) | 2(2) | ∞ |
| 15 | * | 3(1) | ∞ |

FIG. 32

| PHASE GROUP | PHASE NUMBER | 2 |
|---|---|---|
| 0 | 0 | COMMUNICATION INFORMATION ON ALLREDUCE COMMUNICATION OF GRADIENT 0 |
| 0 | 1 | COMMUNICATION INFORMATION ON ALLREDUCE COMMUNICATION OF GRADIENT 0 |
| 1 | 2 | |
| 1 | 3 | |
| 2 | 4 | |
| 2 | 5 | |
| 3 | 6 | |
| 3 | 7 | |
| 4 | 8 | COMMUNICATION INFORMATION ON ALLREDUCE COMMUNICATION OF GRADIENT ∞ |
| 4 | 9 | COMMUNICATION INFORMATION ON ALLREDUCE COMMUNICATION OF GRADIENT ∞ |
| 5 | 10 | COMMUNICATION INFORMATION ON ALLREDUCE COMMUNICATION OF GRADIENT ∞ |
| 5 | 11 | COMMUNICATION INFORMATION ON ALLREDUCE COMMUNICATION OF GRADIENT ∞ |

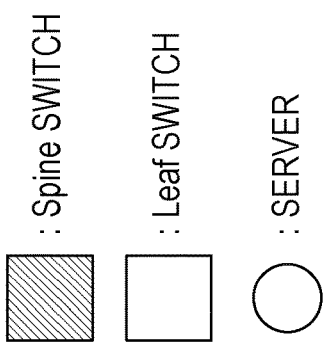
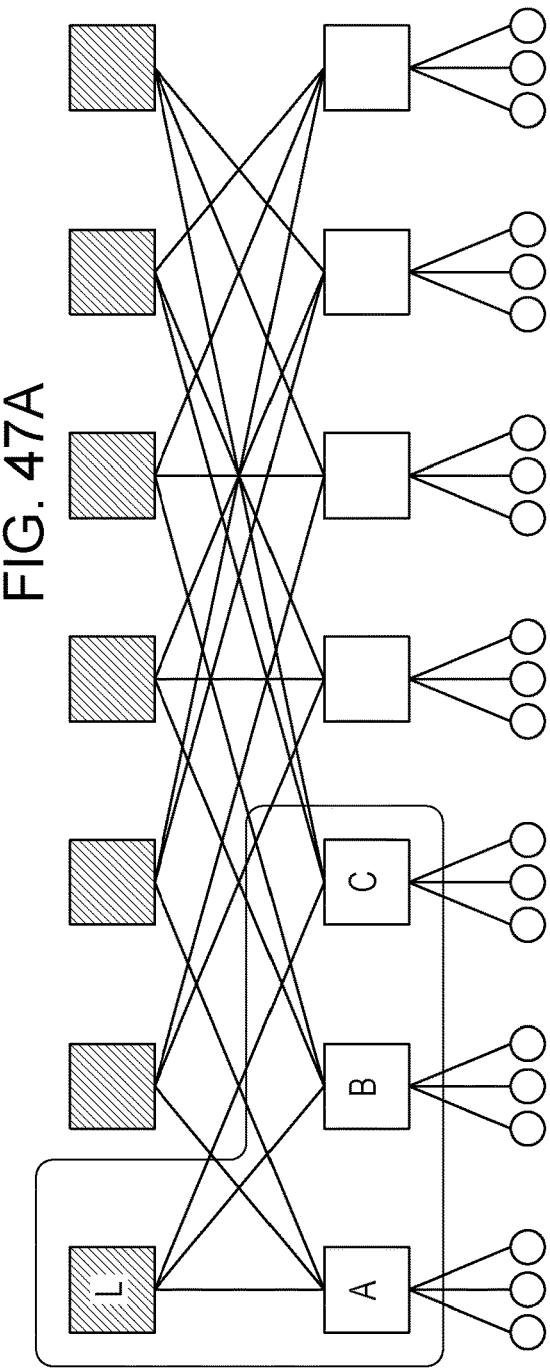
FIG. 47A
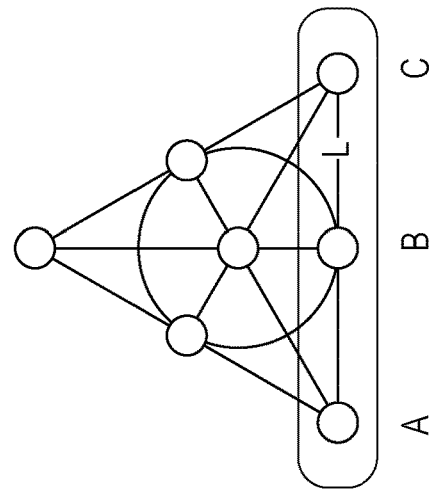
FIG. 47B

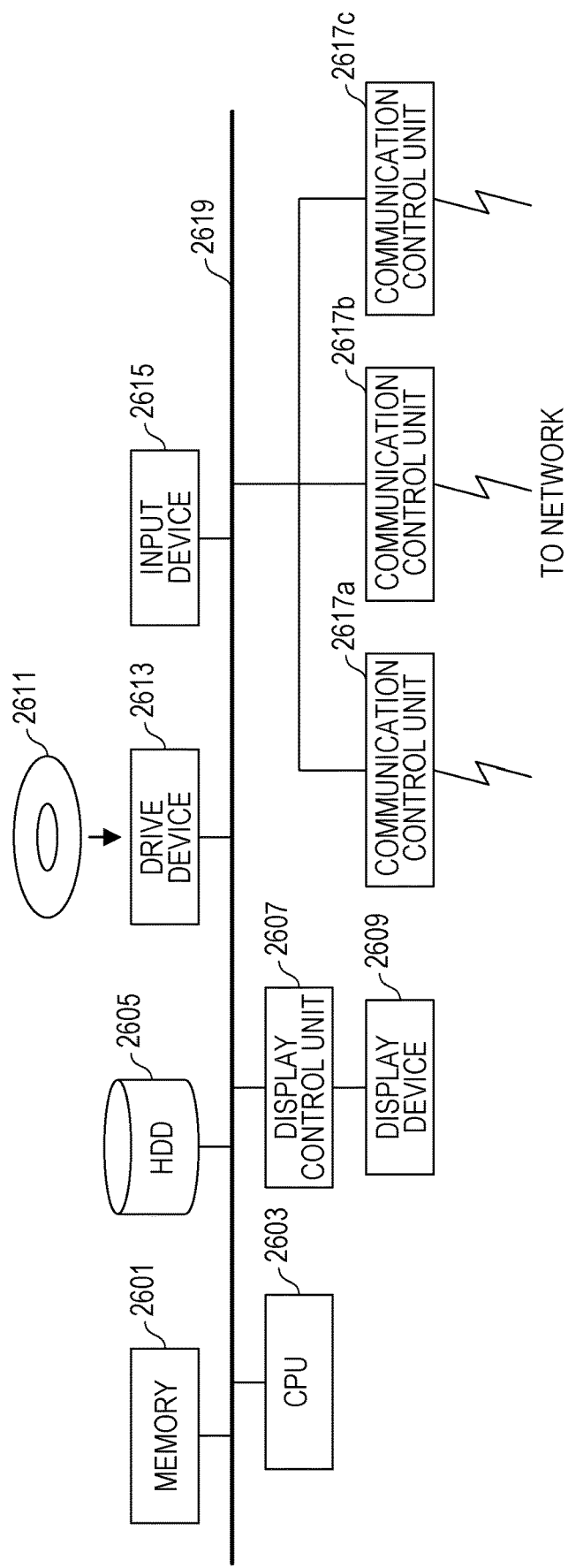

INFORMATION PROCESSING SYSTEM, METHOD, AND APPARATUS

CROSS-REFERENCE TO RELATED APPLICATION

This application is based upon and claims the benefit of priority of the prior Japanese Patent Application No. 2017-125356, filed on Jun. 27, 2017, the entire contents of which are incorporated herein by reference.

FIELD

The embodiments discussed herein are related to an information processing system, an information processing method, and an information processing apparatus.

BACKGROUND

When efficiency of communication within a parallel computer is improved by optimizing a connection form between servers and switches (that is, network topology) in the parallel computer, it is possible to increase throughput of parallel distributed processing executed by the parallel computer. When it is possible to connect a large number of servers with a small number of switches by optimizing the network topology in the parallel computer, the construction cost of the parallel computer may be reduced.

A network topology called Latin square fat tree is known. The Latin square fat tree has a feature that there exists only one route via a Spine switch between any two different Leaf switches. When the Latin square fat tree is used, it is possible to connect more servers with the same number of switches as compared with a general two-stage fat tree.

Each Leaf switch in a system (hereafter, referred to as a Latin square fat tree system) employing the Latin square fat tree is connected to a plurality of servers and a plurality of Spine switches through a plurality of links. Accordingly, there are cases where a Leaf switch may be used for another collective communication when the Leaf switch is used for certain collective communication, but such a point of view is not paid attention to.

Related techniques are disclosed in, for example, M. Valerio, L. E. Moser and P. M. Melliar-Smith, "Recursively Scalable Fat-Trees as Interconnection Networks", IEEE 13th Annual International Phoenix Conference on Computers and Communications, 1994.

SUMMARY

According to an aspect of the present invention, provided is an information processing system including a plurality of Spine switches, a plurality of Leaf switches coupled to the plurality of Spine switches in a form of a Latin square fat tree, and a plurality of information processing apparatuses each coupled to any one of the plurality of Leaf switches and including a first processor. The first processor is configured to perform, in a case where the first processor is included in one of first information processing apparatuses coupled to one of first Leaf switches among the plurality of Leaf switches, a first collective communication with others of the first information processing apparatuses on a route via a first Spine switch of the plurality of Spine switches. The first Leaf switches correspond to at least a portion of points other than points at infinity of a finite projective plane corresponding to the Latin square fat tree. The first processor is configured to perform, in a case where the first processor is included in the one of the first information processing apparatuses, a second collective communication with others of the first information processing apparatuses on a route via a second Spine switch of the plurality of Spine switches at each phase of the first collective communication. The second Spine switch is different from the first Spine switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating Allreduce communication;

FIGS. 3A and 3B are diagrams illustrating the Allreduce communication;

FIGS. 17A and 17B are diagrams illustrating the Allreduce between the servers connected to the execution switch;

FIG. 20 is a diagram illustrating an example of a first communication table;

FIG. 22 is a diagram illustrating an example of a second communication table (A);

FIG. 29 is a diagram illustrating a group of phases at which Allreduce communication is executable and a usable gradient;

FIG. 31 is a diagram illustrating the group of phases at which Allreduce communication is executable and the usable gradient;

FIG. 32 is a diagram illustrating an example of a second communication table (B);

FIGS. 47A and 47B are diagrams illustrating the Latin square fat tree and the finite projective plane;

FIG. 50 is a functional block diagram of a switch.

DESCRIPTION OF EMBODIMENTS

Embodiment 1

All-to-all communication is a type of collective communication. The all-to-all communication is communication in which each node in a parallel computer transmits data to all nodes in the parallel computer and receives data from all of the nodes.

Allreduce communication is also a type of collective communication. The Allreduce communication is communication for all target nodes to have a result of computation executed using data held by all of the target nodes, and Allreduce is the computation for the Allreduce communication.

FIGS. 1 to 4 are diagrams illustrating Allreduce communication. In FIG. 1, a server n0 has a value "4", a server n1 has a value "8", a server n2 has a value "1", a server n3 has a value "5", a server n4 has a value "6", and a server n5 has a value "3". In a case where a computation designated in Allreduce is "addition", each of the servers n0 to n5 will have a value "27".

Figure 2A:
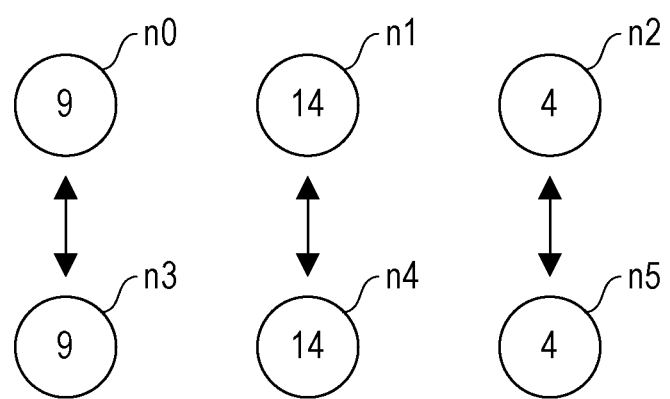
FIGS. 2A and 2B are diagrams illustrating the Allreduce communication.

Allreduce communication for realizing a state illustrated on the right side of FIG. 1 is performed as illustrated FIGS. 2 and 3, for example. First, as illustrated in FIG. 2A, a value "9" is calculated by addition of values shared between the server n0 and the server n3, a value "14" is calculated by addition of values shared between the server n1 and the server n4, and a value "4" is calculated by addition of values shared between the server n2 and the server n5.

Figure 2B:
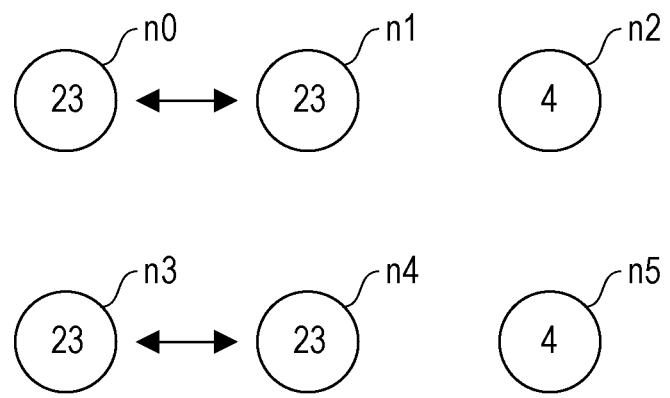

Then, as illustrated in FIG. 2B, a value "23" is calculated by addition of values shared between the server n0 and the server n1 and the value "23" is calculated by addition of values shared between the server n3 and the server n4.

Then, as illustrated in FIG. 3A, a value "27" is calculated by addition of values shared between the server n1 and the server n2 and the value "27" is calculated by addition of values shared between the server n4 and the server n5.

Finally, as illustrated in FIG. 3B, the server n1 transmits the value "27" to the server n0 and the server n4 transmits the value "27" to the server n3. With this, as illustrated in FIG. 3B, the servers n0 to n5 are able to have the value "27".

Figure 4A:
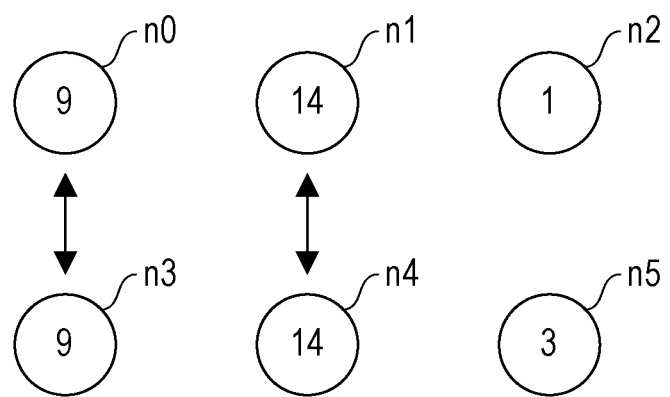
FIGS. 4A and 4B are diagrams illustrating the Allreduce communication.

Here, the target may not be all the servers n0 to n5, but some of the servers n0 to n5 may be the target. As an example, description will be made on Allreduce communication in a case where the servers n0, n1, n3, and n4 are targeted. First, as illustrated in FIG. 4A, a value "9" is calculated by addition of values shared between the server n0 and the server n3 and a value "14" is calculated by addition of values shared between the server n1 and the server n4.

Figure 4B:
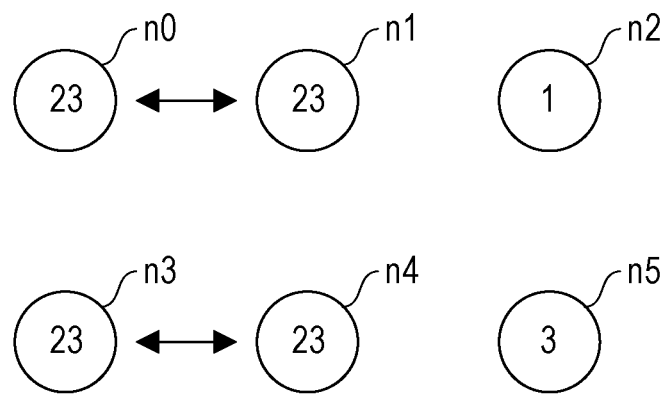

Here, as illustrated in FIG. 4B, a value "23" is calculated by addition of values shared between the server n0 and the server n1 and the value "23" is calculated by addition of values shared between the server n3 and the server n4. With this, the servers n0, n1, n3, and n4 are able to have the value "23".

Figure 5:
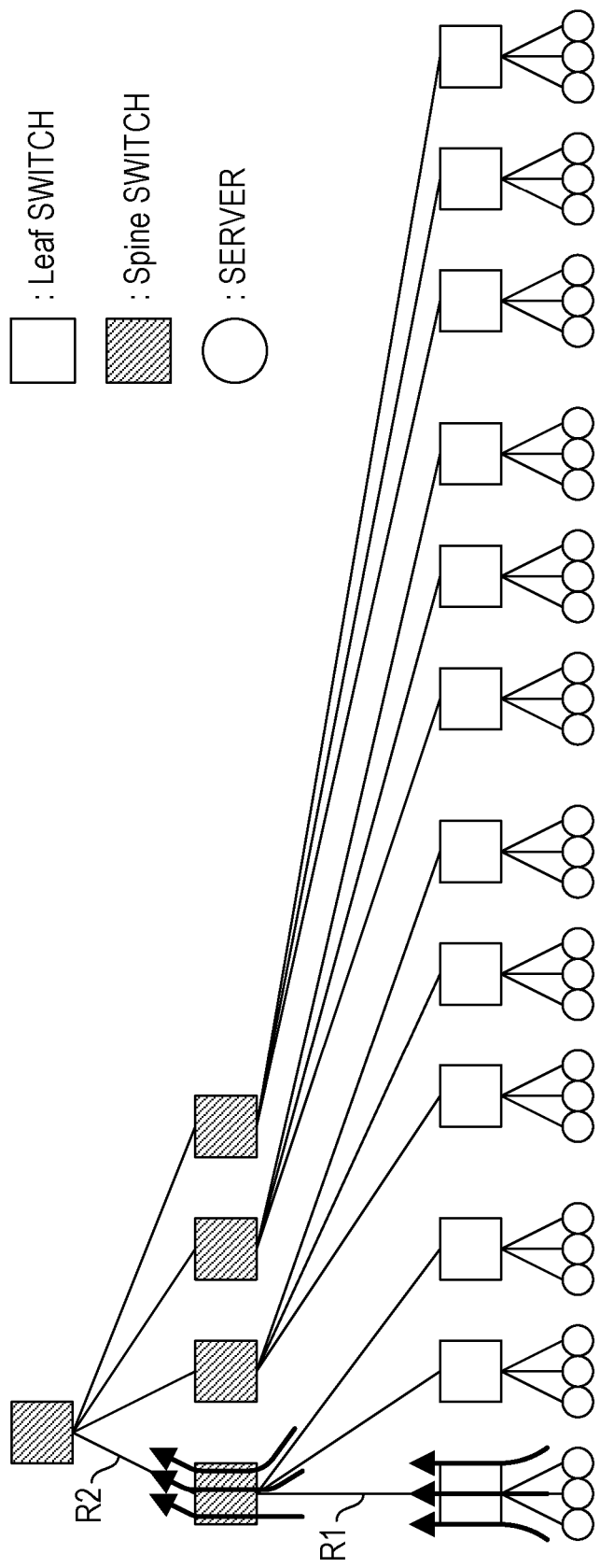
FIG. 5 is a diagram illustrating a route conflict in a case where the Allreduce communication is executed in topology of a general tree structure.
Figure 6:
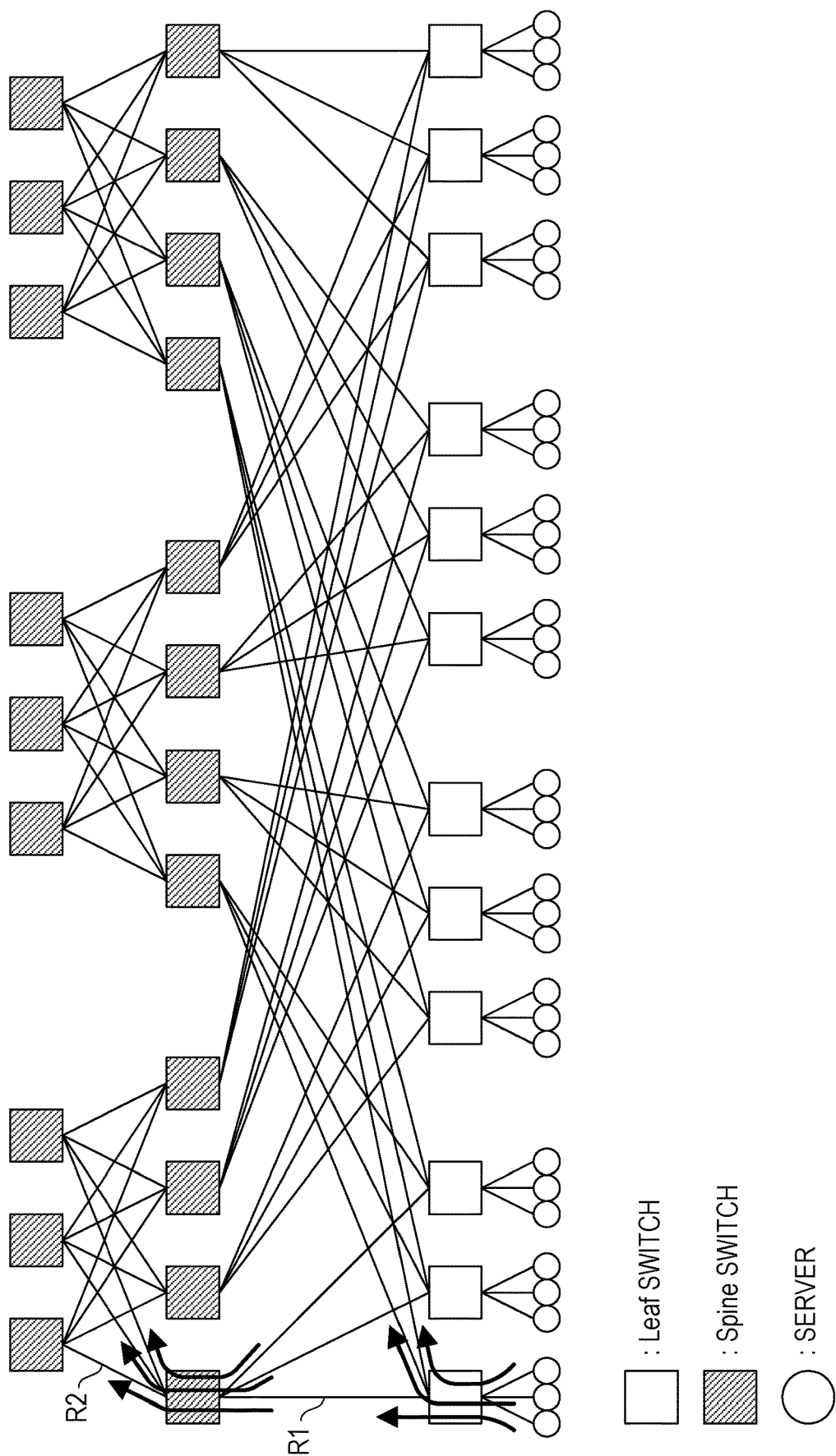
FIG. 6 is a diagram illustrating a route conflict in a case where Allreduce communication is executed in topology of a fat tree structure.

In Embodiment 1, execution of all-to-all communication and Allreduce communication in parallel without causing a route conflict by using a specific Leaf switch group in the Latin square fat tree system is considered. Here, a route conflict means that a plurality of packets are transmitted simultaneously in the same direction of one route, and the communication time becomes longer due to occurrence of a route conflict. As an example, FIG. 5 illustrates a route conflict when Allreduce communication is executed in a general tree structure topology. In FIG. 5, a circle figure represents a server, a non-hatched square figure represents a Leaf switch, and a hatched square figure represents a Spine switch. In FIG. 5, a route conflict occurs on a route R1, and a route conflict also occurs on a route R2. In this case, for example, as illustrated in FIG. 6, it is possible to avoid route conflicts by changing the tree structure to a fat tree structure. However, when the fat tree structure is adopted, the total number of switches becomes larger than that in the example of FIG. 5.

Figure 7:
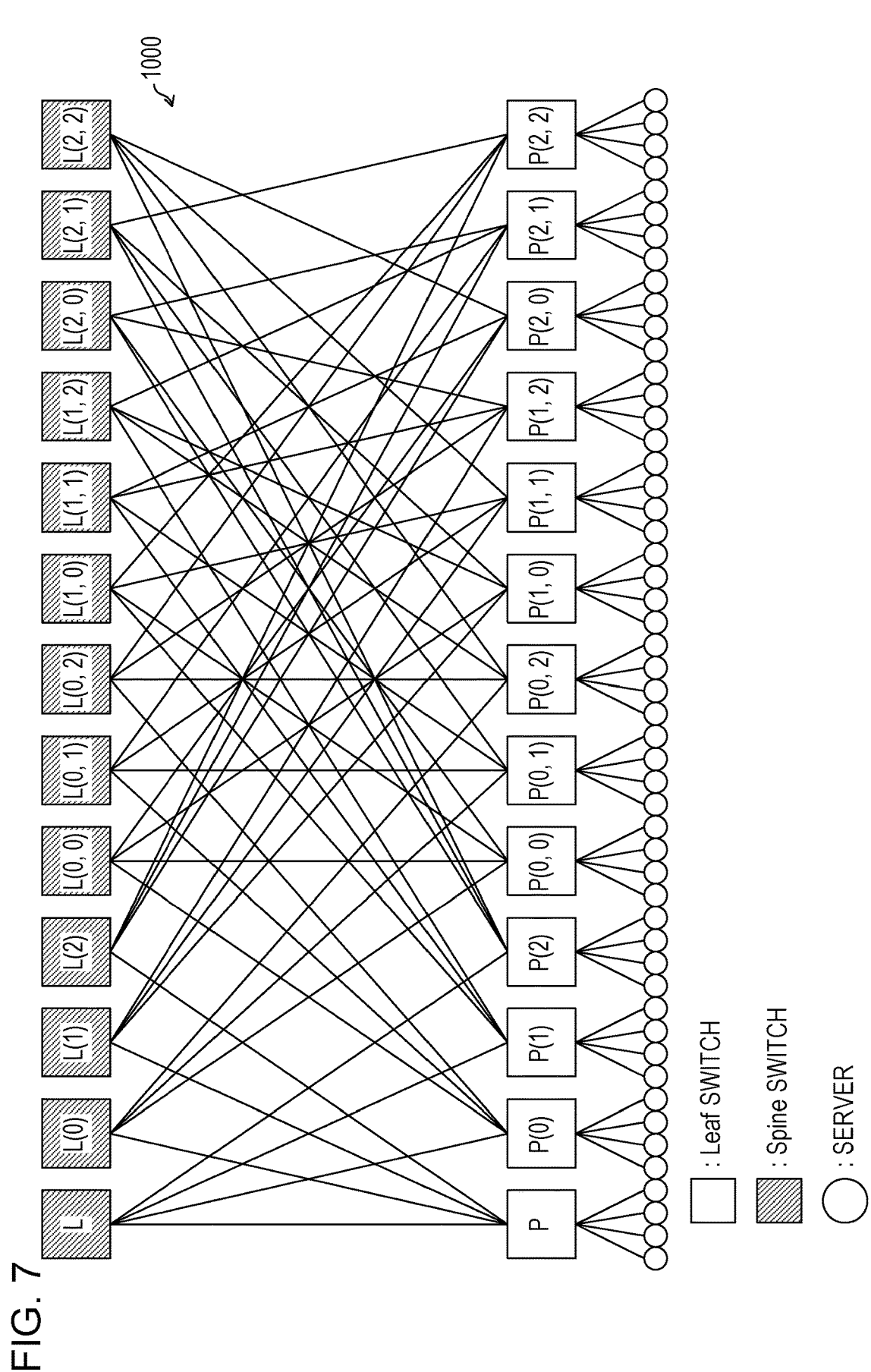
FIG. 7 is a diagram illustrating an outline of a Latin square fat tree system of an embodiment.

FIG. 7 is a diagram illustrating a Latin square fat tree system 1000 of Embodiment 1. In Embodiment 1, a connection form between 13 Spine switches and 13 Leaf switches is a Latin squared fat tree. Because four servers are connected to each Leaf switch, the Latin square fat tree system 1000 has 52 servers that perform parallel distributed processing. The Spine switches and Leaf switches are, for example, InfiniBand switches. Each server is, for example, a physical server. In the following, the number of servers connected to the Leaf switch is set as d. In Embodiment 1, d=4.

In the example illustrated in FIG. 7, the number of Spine switches and the number of Leaf switches are 13, respectively, but may be other than 13. For other examples, refer to the appendix.

Figure 8:
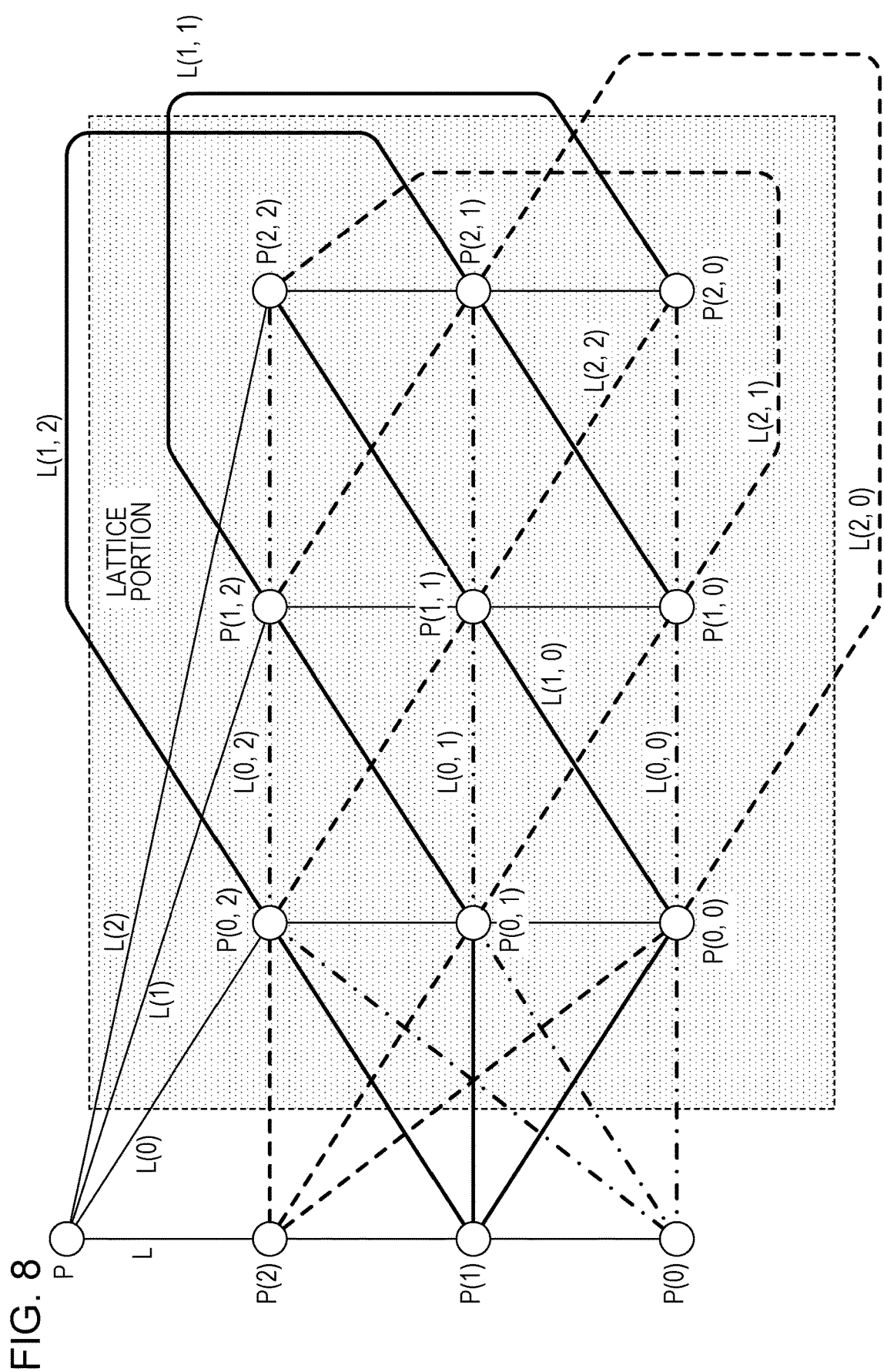
FIG. 8 is a diagram illustrating a finite projective plane.

In FIG. 7, a character string that represents a point of a finite projective plane corresponding to the Latin square fat tree illustrated in FIG. 7 is attached to each Spine switch and each Leaf switch. FIG. 8 is a diagram illustrating a finite projective plane corresponding to the Latin square fat tree illustrated in FIG. 7. The order of the finite projective plane illustrated in FIG. 8 is 3, and the number of ports of the Spine switch and the number of ports the Leaf switch are 8, respectively. A point represents a Leaf switch, and a straight line represents a Spine switch. In the case where the lattice portion is determined as illustrated in FIG. 7, a Leaf switch P, a Leaf switch P(0), a Leaf switch P(1), and a Leaf switch P(2) correspond to points at infinity. For the finite projective plane, refer to the Appendix below.

Figure 9:
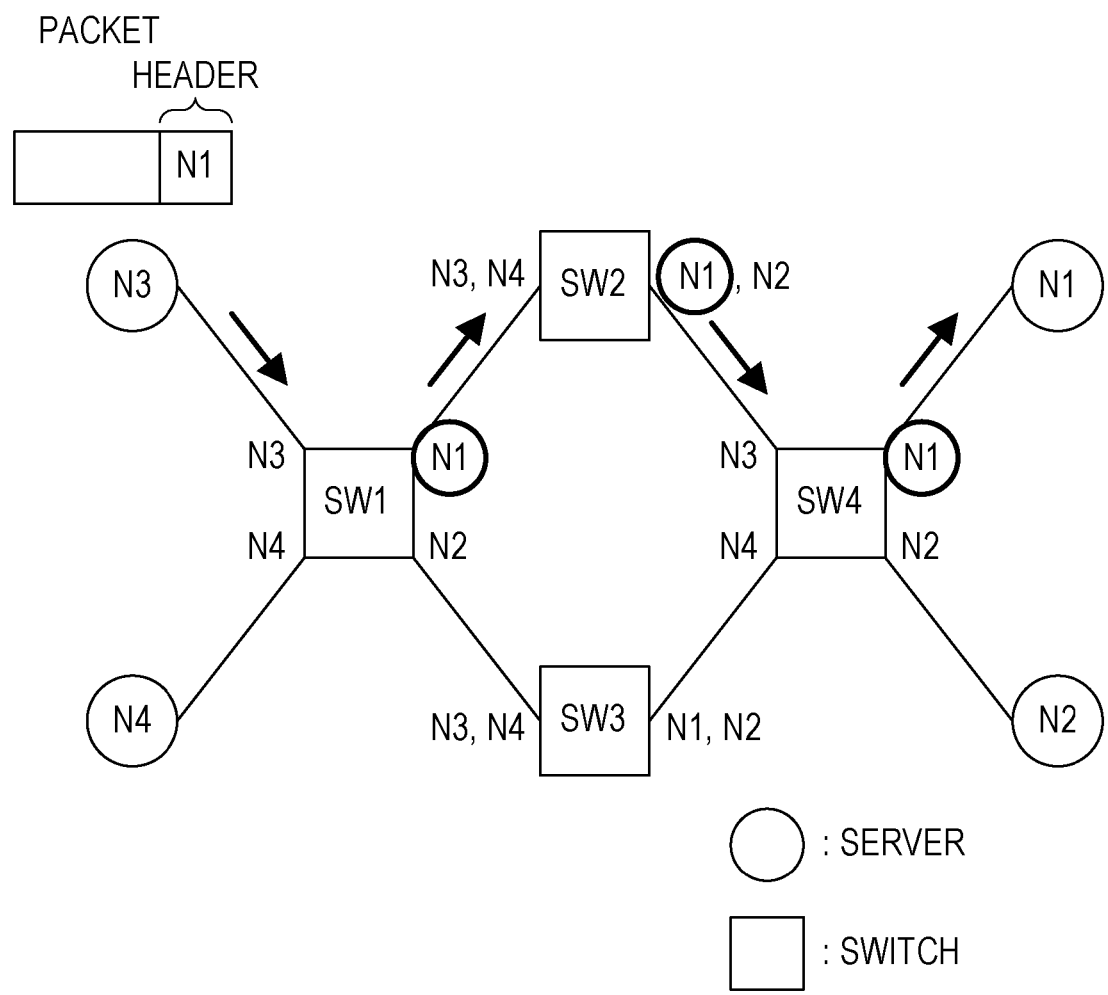
FIG. 9 is a diagram illustrating routing in an InfiniBand network.

In the Latin square fat tree system 1000 of the present embodiment, an InfiniBand network in which regular and fixed routing is performed is used in order to avoid a route conflict. Routing in the InfiniBand network will be described with reference to FIG. 9. In FIG. 9, circle figures represent servers and square figures represent switches. The line segments represent links of the InfiniBand, and character strings next to the line segments represent identification information of a destination server. The thick solid arrows represent the communication routes.

In the example of FIG. 9, the server N3 transmits a packet of which destination is a server N1. The header of the packet includes destination identification information (for example, Local Identifier (LID)). Because each output port in each switch is associated with the identification information of the destination server, each switch outputs the packet to the output port corresponding to the destination identification information contained in the packet. In the example of FIG. 9, the packet reaches the server N1 via a switch SW1, a switch SW2 and a switch SW4.

As described above, the network of Embodiment 1 is not a network in which a route is automatically determined like Ethernet (registered trademark), but a network in which regular and fixed routing is performed.

It is assumed that a number is allocated to each server, in addition to the identification information described above. Specifically, any one of numbers from 0 to 3 is allocated to each of four servers connected to each Leaf switch. A server to which "0" is allocated, a server to which "1" is allocated, a server to which "2" is allocated, and a server to which "3" is allocated are connected to each Leaf switch.

Figure 10:
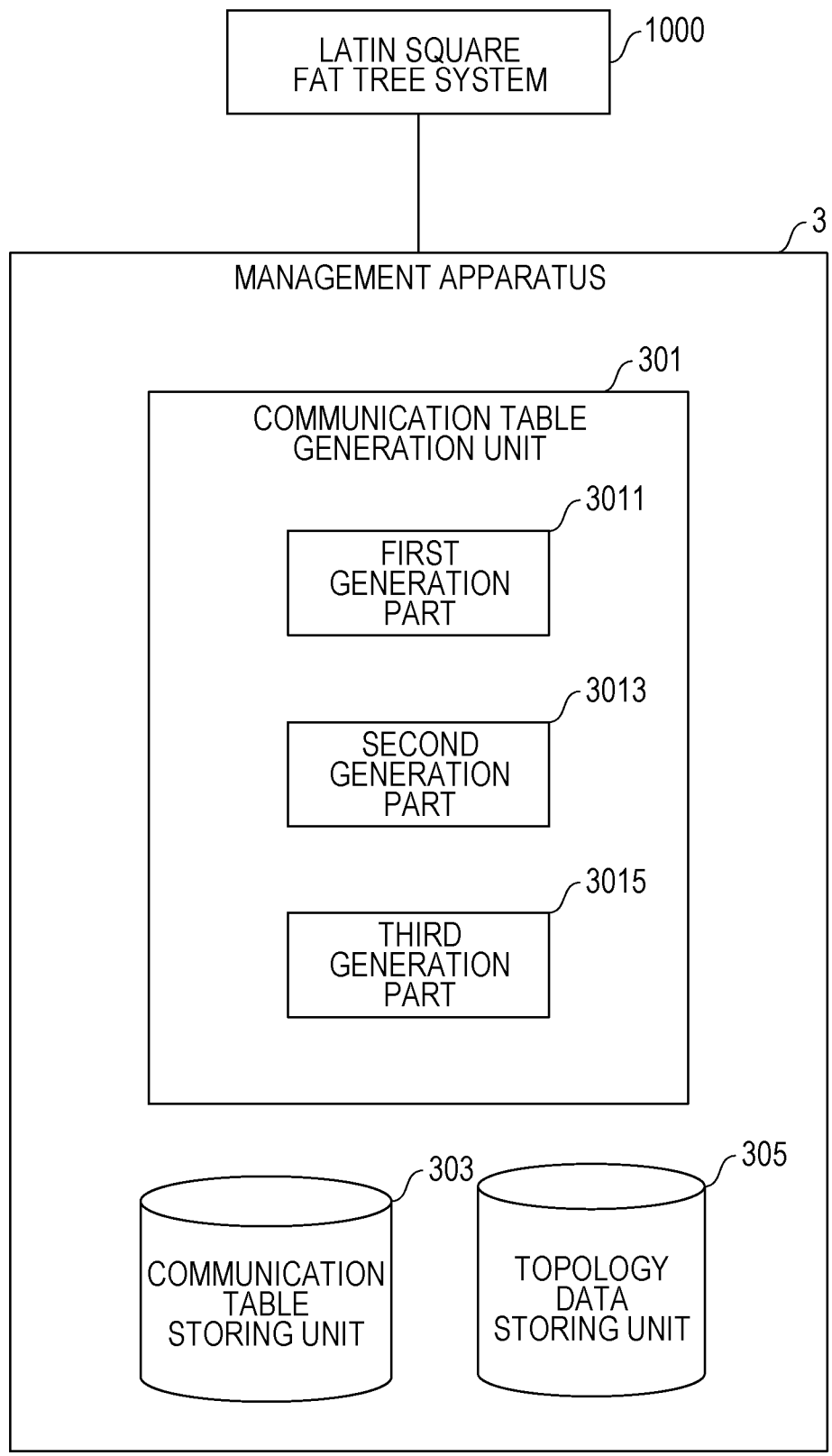
FIG. 10 is a functional block diagram of a management apparatus.
Figure 49:
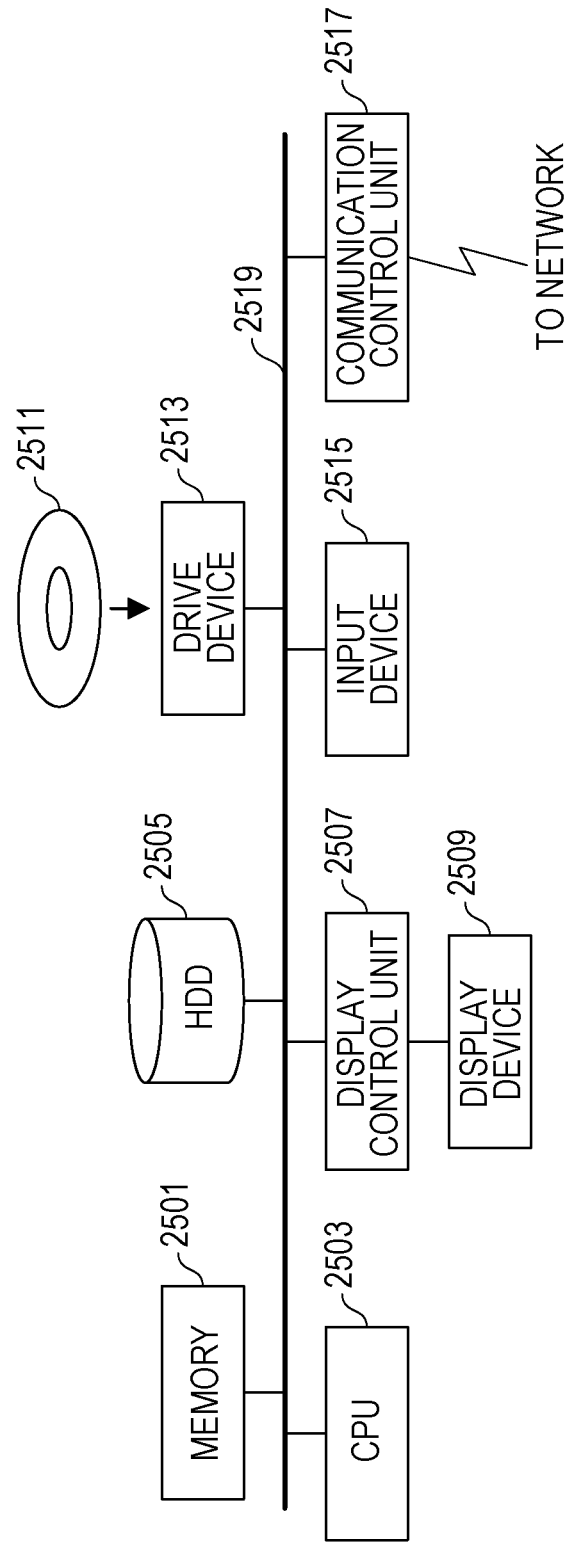
FIG. 49 is a functional block diagram of a computer.

As illustrated in FIG. 10, the Latin square fat tree system 1000 is connected to a management apparatus 3 via a management local area network (LAN) and the like, and communication in the Latin square fat tree system 1000 is managed by the management apparatus 3. The management apparatus 3 includes a communication table generation unit 301, a communication table storing unit 303 and a topology data storing unit 305. The communication table generation unit 301 includes a first generation part 3011, a second generation part 3013, and a third generation part 3015. The communication table generation unit 301 is realized by allowing a program loaded in a memory 2501 to be executed on a central processing unit (CPU) 2503. The memory 2501 and the CPU 2503 are illustrated in FIG. 49. The communication table storing unit 303 and the topology data storing unit 305 may be provided, for example, in the memory 2501 or a hard disk drive (HDD) 2505 also illustrated in FIG. 49.

The first generation part 3011 generates a first communication table based on information of a network topology of the Latin square fat tree system 1000 stored in the topology data storing unit 305 and input parameters, and stores the generated first communication table in the communication table storing unit 303. The second generation part 3013 generates a second communication table (A) and a second communication table (B) based on information of the network topology of the Latin square fat tree system 1000 stored in the topology data storing unit 305, and stores the generated second communication table (A) and second communication table (B) in the communication table storing unit 303. The third generation part 3015 generates a third communication table based on information of the network topology of the Latin square fat tree system 1000 stored in the topology data storing unit 305 and stores the generated third communication table in the communication table storing unit 303. The communication table generation unit 301 transmits the first communication table, the second communication table (A), the second communication table (B), and the third communication table stored in the communication table storing unit 303 to a server that executes collective communication, at a predetermined timing or in response to a request.

Figure 11:
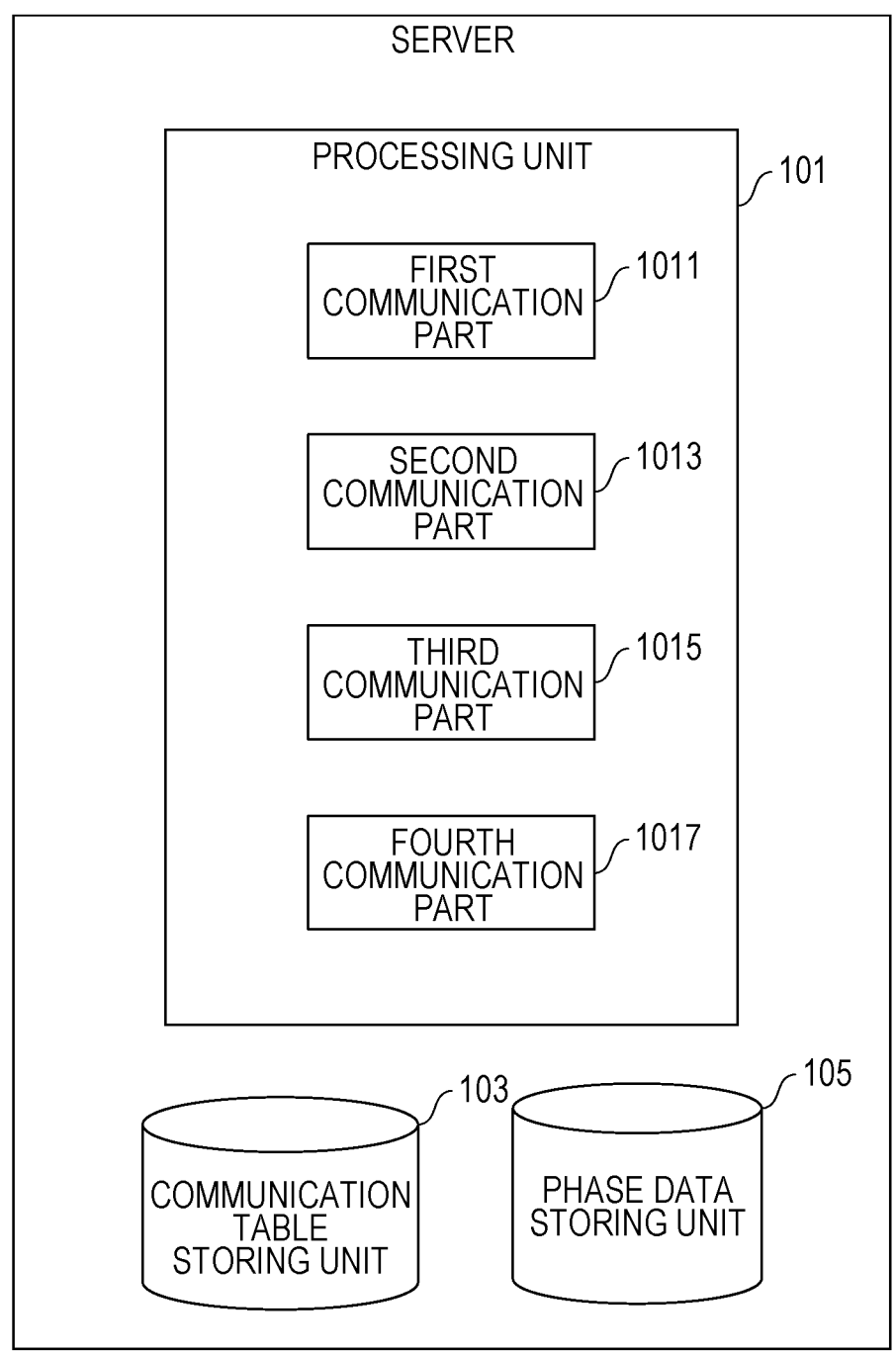
FIG. 11 is a functional block diagram of a server.

FIG. 11 is a functional block diagram of the server. The server has a processing unit 101, a communication table storing unit 103, and a phase data storing unit 105. The processing unit 101 includes a first communication part 1011, a second communication part 1013, a third communication part 1015, and a fourth communication part 1017. The processing unit 101 is realized, for example, by allowing a program loaded in the memory 2501 to be executed on the CPU 2503. The memory 2501 and the CPU 2503 are illustrated in FIG. 49. The communication table storing unit 103 and the phase data storing unit 105 may be provided in the memory 2501 or the HDD 2505 also illustrated in FIG. 49, for example.

The first communication table, the second communication table (A), the second communication table (B), and the third communication table received from the management apparatus 3 are stored in the communication table storing unit 103. The first communication part 1011 performs communication according to the first communication table stored in the communication table storing unit 103. The second communication part 1013 performs communication according to the second communication table (A) stored in the communication table storing unit 103. The third communication part 1015 performs communication according to the second communication table (B) stored in the communication table storing unit 103. The second communication part 1013 and the third communication part 1015 control a phase of collective communication based on data stored in the phase data storing unit 105. The fourth communication part 1017 performs communication according to the third communication table stored in the communication table storing unit 103.

Figure 12:
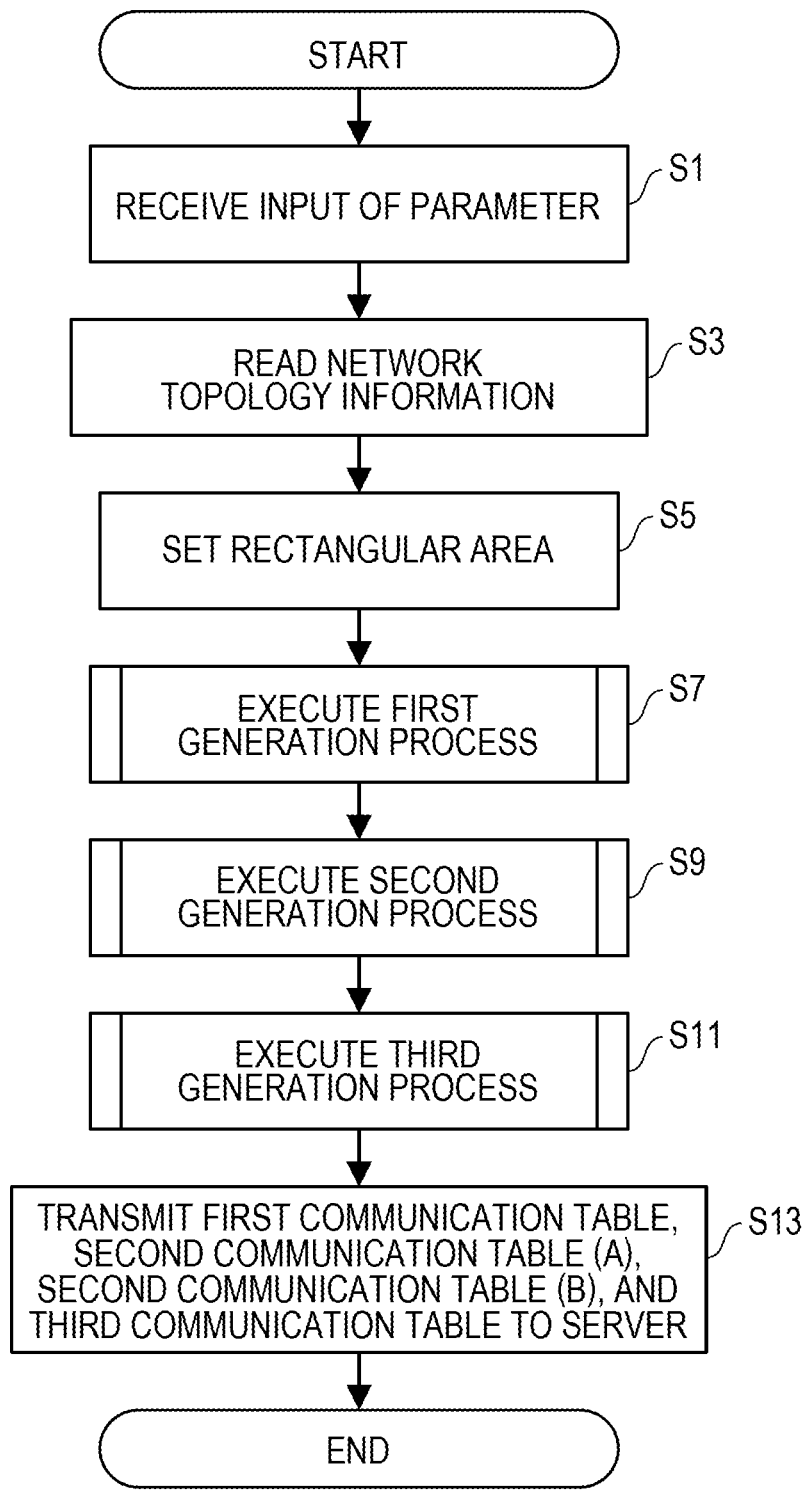
FIG. 12 is a diagram illustrating a process flow of a process executed by the management apparatus.

Next, a process performed by the management apparatus 3 will be described with reference to FIGS. 12 to 40. FIG. 12 is a diagram illustrating a process flow of a process executed by the management apparatus 3.

The communication table generation unit 301 in the management apparatus 3 receives input of parameters from a user (Step S1 in FIG. 12). The parameters to be input are n, k, and m. The input parameters will be described later.

The communication table generation unit 301 reads information of a network topology of the Latin square fat tree system 1000 from the topology data storing unit 305 (Step S3). The information of the network topology includes, for example, information on a connection relationship between the Spine switch, the Leaf switch, and the server.

The communication table generation unit 301 sets a rectangular area in the lattice portion of the finite projective plane based on information input in Step S1 and information read in Step S3 (Step S5).

Figure 13:
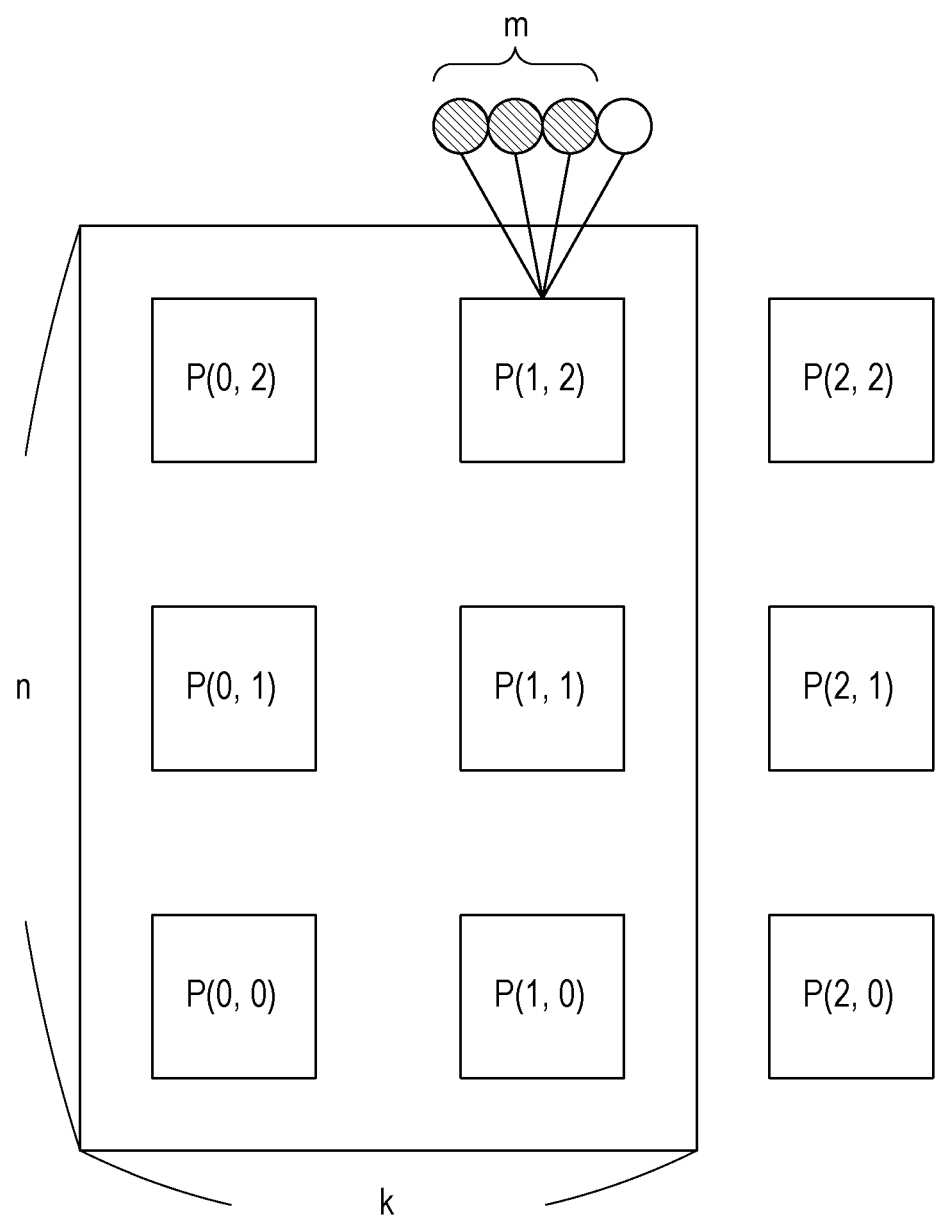
FIG. 13 is a diagram illustrating setting of a rectangular area.

FIG. 13 is a diagram illustrating the rectangular area. In FIG. 13, Leaf switches corresponding to a lattice portion, that is points other than the points at infinity among the Leaf switches in the Latin square fat tree system 1000, are illustrated. The parameter m represents the number of rows in the rectangular area, the parameter k represents the number of columns in the rectangular area, and the parameter m represents the number of servers participating in the collective communication. In Embodiment 1, servers connected to Leaf switches other than Leaf switches (hereafter, referred to as "execution switch") included in the rectangular area do not participate in the collective communication. In the following description, it is assumed that n=3, k=2, m=3 unless otherwise stated, and the server with allocated number 0 or 1 performs all-to-all communication and the server with the allocated number is 2 executes Allreduce communication.

The first generation part 3011 executes a first generation process that is a process of generating the first communication table, based on the rectangular area set in Step S5 and information of the network topology read in Step S3 (Step S7). The first generation process will be described later.

The second generation part 3013 executes a second generation process which is a process of generating the second communication table (A) and the second communication table (B) based on the rectangular area set in Step S5 and the information of the network topology read in Step S3 (Step S9). The second generation process will be described later.

The third generation part 3015 executes the third generation process which is a process of generating the third communication table, based on the rectangular area set in Step S5 and the information of the network policy read out in Step S3 (Step S11). The third generation process will be described later.

The communication table generation unit 301 reads the first communication table, the second communication table (A), the second communication table (B), and the third communication table stored in the communication table storing unit 303. The communication table generation unit 301 transmits the first communication table, the second communication table (A), the second communication table (B), and the third communication table to the servers that perform collective communication (that is, a server with an allocated number of 0, a server with an allocated number of 1, and a server with an allocated number of 2, among the servers connected to the execution switch) (Step S13), and the process is ended.

When the process described above is performed, the server that receives the first communication table, the second communication table (A), the second communication table (B), and the third communication table may execute collective communication to be executed by the server in an appropriate procedure.

Figure 14:
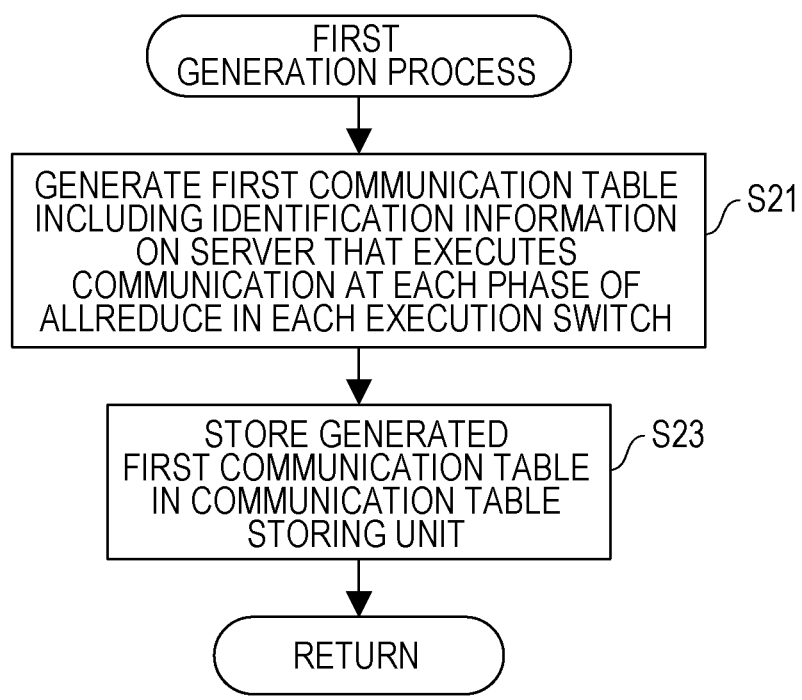
FIG. 14 is a diagram illustrating a process flow of a first generation process.

Next, the first generation process will be described with reference to FIGS. 14 to 20. FIG. 14 is a diagram illustrating a process flow of the first generation process.

The first generation part 3011 generates a first communication table including identification information of a server that executes communication at each phase of Allreduce in each execution switch (Step S21 in FIG. 14).

FIGS. 15A to 19 are diagrams illustrating Allreduce between the servers connected to the execution switch. In FIGS. 15A to 19, square figures represents a Leaf switch circle figures represent servers, and line segments connecting the Leaf switch and the servers represent links. The numbers attached to the servers represents a value held by the servers.

Figure 15A:
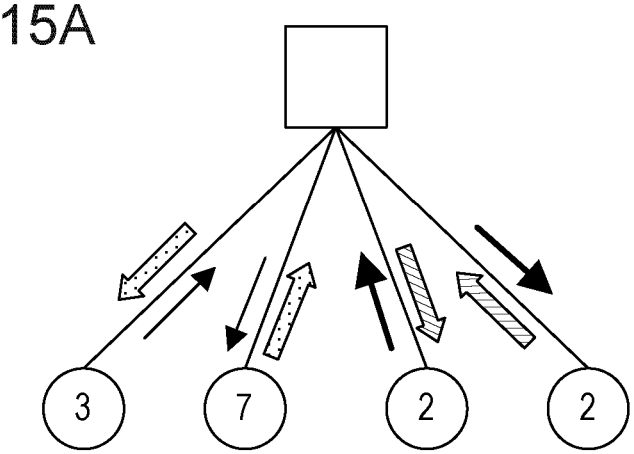
FIGS. 15A and 15B are diagrams illustrating Allreduce between servers connected to an execution switch.
Figure 15B:
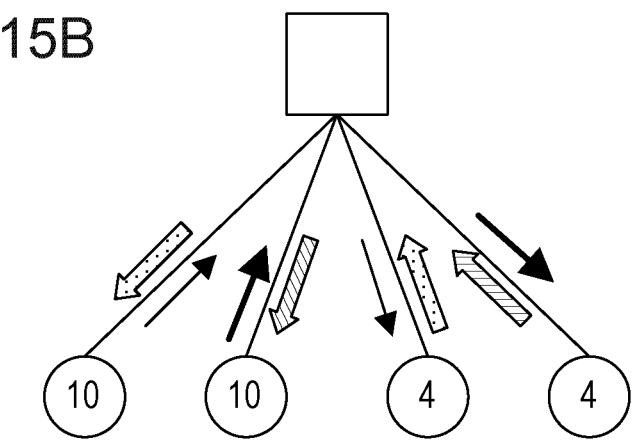
Figure 16:
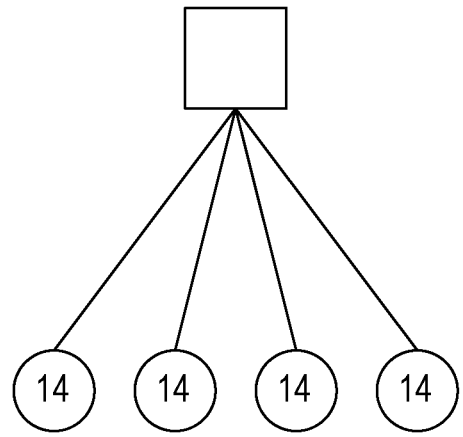
FIG. 16 is a diagram illustrating the Allreduce between the servers connected to the execution switch.

First, a case where the number of servers connected to the Leaf switch is an even number (in this case, 4 which is the power of 2) is described using FIGS. 15A, 15B, and 16.

For example, it is assumed that four servers have "3", "7", "2", and "2", respectively, as illustrated in FIG. 15A. In this case, the value is shared in each server of a pair including two servers, and computation (here, addition) of the value is performed. Here, because a plurality of packets are not transmitted simultaneously in the same direction of one route, a route conflict does not occur.

Then, as illustrated in FIG. 15B, two servers have a value of "10" and the remaining two servers have a value of "4". Then, the value is shared in each pair including the server having the value "10" and the server having the value "4", and computation (in this case, addition) of the value is performed. Here, because a plurality of packets are not transmitted simultaneously in the same direction of one route, a route conflict does not occur.

With this, each server eventually has the value of "14" as illustrated in FIG. 16.

Next, a case where the number of servers connected to the Leaf switch is an odd number (in this case, 5) will be described with reference to FIG. 17A to FIG. 19.

For example, it is assumed that five servers have "1", "4", "5", "2", and "8", respectively, as illustrated in FIG. 17A. In this case, a value is shared by two of the five servers, and computation (here, addition) of the value is performed. Here, because a plurality of packets are not transmitted simultaneously in the same direction of one route, a route conflict does not occur.

Then, as illustrated in FIG. 17B, five servers have "1", "4", "5", "10", and "10", respectively. Then, computation of a value, by which the value is shared between the pair including the server having the value "1" and the server having the value "4" and the pair including the server having the value "5" and the server having the value "10", is performed. Here, because a plurality of packets are not transmitted simultaneously in the same direction of one route, a route conflict does not occur.

Figure 18A:
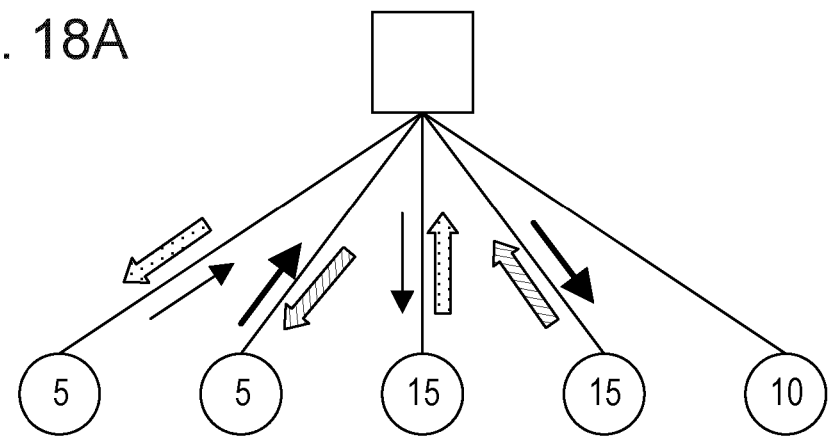
FIGS. 18A and 18B are diagrams illustrating the Allreduce between servers connected to the execution switch.

Then, as illustrated in FIG. 18A, the five servers have "5", "5", "15", "15", and "10", respectively. Accordingly, computation of a value, by which the value is shared between the servers of the pair including the server having the value "5" and the server having the value "15", is performed. Here, because a plurality of packets are not transmitted simultaneously in the same direction of one route, a route conflict does not occur.

Figure 18B:
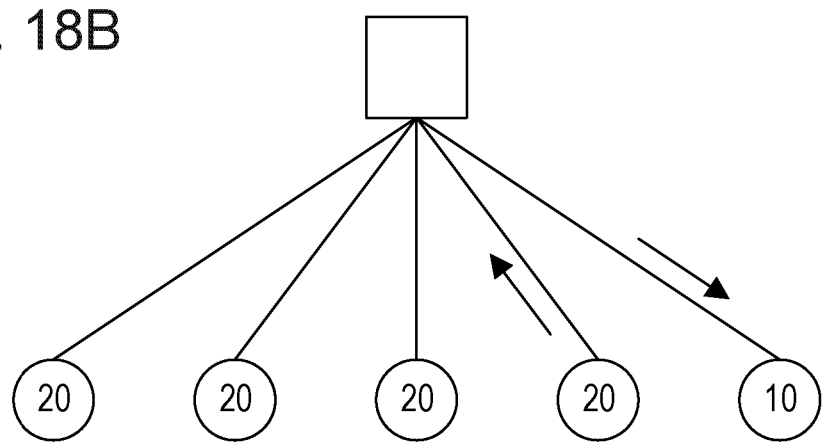

Then, as illustrated in FIG. 18B, five servers have "20", "20", "20", "20", and "10", respectively. Then, the server having the value "20" notifies the server having the value "10" of the value "20". Here, because a plurality of packets are not transmitted simultaneously in the same direction of one route, a route conflict does not occur.

Figure 19:
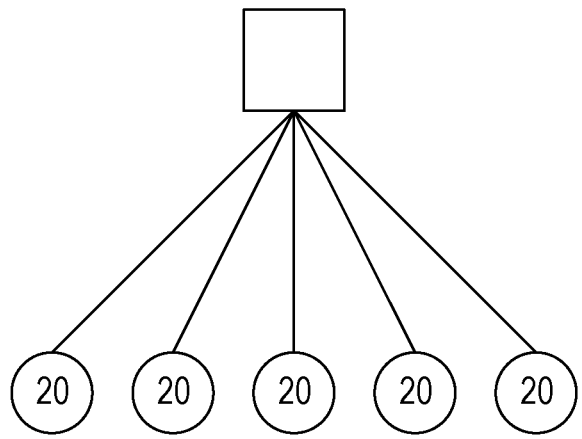
FIG. 19 is a diagram illustrating the Allreduce between servers connected to the execution switch.

Then, as illustrated in FIG. 19, five servers eventually have the value "20".

Although description described above is an example of Allreduce performed among a plurality of servers, even in a case where the number of servers is other than the number in this example, basically, it is possible to perform Allreduce in the same manner.

Here, a process (hereinafter, referred to as Allreduce(x)) of generating a communication table in the case of performing Allreduce among x servers (x is a natural number) servers will be described. In Embodiment 1, a communication table is generated by a recursive process.

(1) In a case where the number x of servers connected to the Leaf switch is 1, the process is ended.

(2) In a case where the number x of servers connected to the Leaf switch is 2, communication information (specifically, information on a pair of the servers) about communication between two servers is written into the communication table.

(3) In a case where the number of servers connected to the Leaf switch is an odd number 2y+1 (y is a natural number), two servers (server P and server Q) of the x servers are selected and communication information on Allreduce communication between the server P and server Q is written to the communication table. Then, Allreduce (2y) is called for one of the server P and the server Q and the remaining (2y−1) servers (that is, 2y servers). Then, communication information for transmitting the result of Allreduce (2y) from the server P to the server Q is written in the communication table.

(4) In a case where the number of servers connected to the Leaf switch is 2y (y is a natural number greater than or equal to 2), the servers are divided into y groups and y groups, and Allreduce (y) is called for each group simultaneously in parallel.

When the process described above is performed, a communication table is generated in a case where Allreduce is executed among the x servers. As is apparent from description of FIGS. 15A to 19, when Allreduce communication is performed according to the communication table generated by such a method, a route conflict does not occur.

Referring back to the descriptions of FIGS. 10 and 14, the first generation part 3011 stores the first communication table generated in Step S21 in the communication table storing unit 303 (Step S23), and the process illustrated in FIG. 12 is continued.

FIG. 20 is a diagram illustrating an example of the first communication table. In the example of FIG. 20, a phase number and information of the pair of the servers executing communication are registered in the first communication table. A character string such as N1 represents identification information (for example, LID) of the server. Communication 1 and communication 2 are executed simultaneously in parallel. For example, in phase 1, communication between the server N1 and the server N2 and communication between the server N3 and the server N4 may be performed simultaneously in parallel. According to the communication table illustrated in FIG. 20, communication partners of the servers in phases 0 to 3 are as follows.

Server N1: -, N2, N3, -, Server N2: -, N1, N4, -, Server N3: -, N4, N1, -, Server N4: N5, N3, N2, N5 (sender), Server N5: N4, -, -, N4 (receiver).

Here, a "-" represents that communication is not performed. The "(sending)" represents transmission of data and the "(receiving)" represents reception of data. For example, the server N5 communicates with the server N4 at the phase 0, does not communicate at phases 1 and 2, and receives data from the server N4 at phase 3. In the example of FIG. 20, communication information on one execution switch is illustrated, but communication information on each execution switch is actually included in the first communication table.

When the process described as above is performed, the servers connected to the same Leaf switch in the rectangular area will have the same result.

Figure 21:
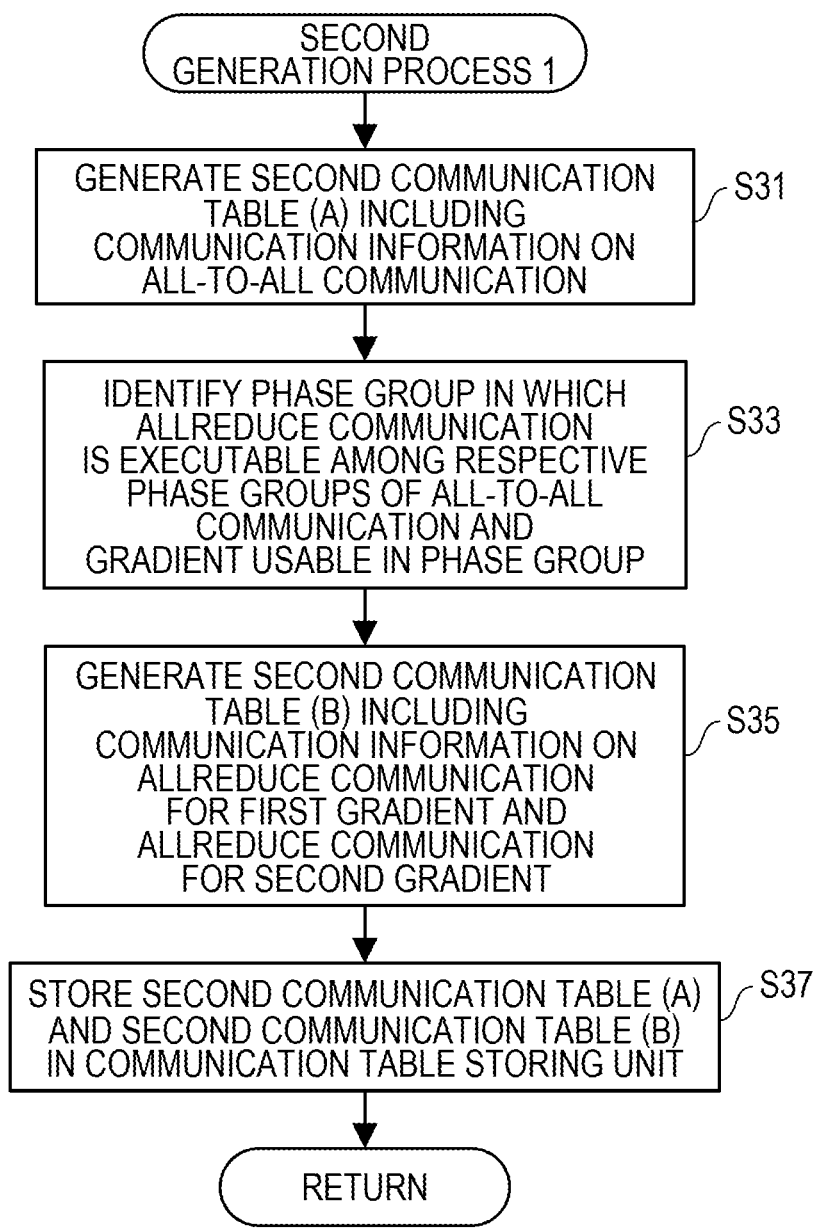
FIG. 21 is a diagram illustrating a process flow of a second generation process according to Embodiment 1.

Next, a second generation process will be described with reference to FIGS. 21 to 36. FIG. 21 is a diagram illustrating a process flow of the second generation process. As described above, in Embodiment 1, the servers with the allocated number "0" or "1" perform all-to-all communication, and the servers with the allocated number "2" perform Allreduce communication.

The second generation part 3013 illustrated in FIG. 10 generates the second communication table (A) including communication information on all-to-all communication (Step S31 in FIG. 21).

FIG. 22 is a diagram illustrating an example of the second communication table A. In the second communication table (A), communication information on each phase group is stored for the server that performs all-to-all communication. Because the number of servers is 2, each phase group contains two phases. The first elements in brackets represent the gradient in the finite projective plane and the second element in brackets represent the number of hops in the finite projective plane. A "*" means that a server transmits data to the server itself.

A method of generating the second communication table (A) will be briefly described. First, one of the columns of the server number is selected, and communication information is written such that the server for that column communicates with all the servers. Next, for any one of the columns not selected, communication information is written such that the server communicates with all the servers. However, the gradient is selected such that the same the gradient does not exist in the row direction (as illustrated in FIG. 22, there is no server for which the same the gradient is set in any row). By repeating such a process, the second communication table (A) is generated. This method is an example of a generation method, and the second communication table (A) may be generated by a method other than this method.

Figure 23:
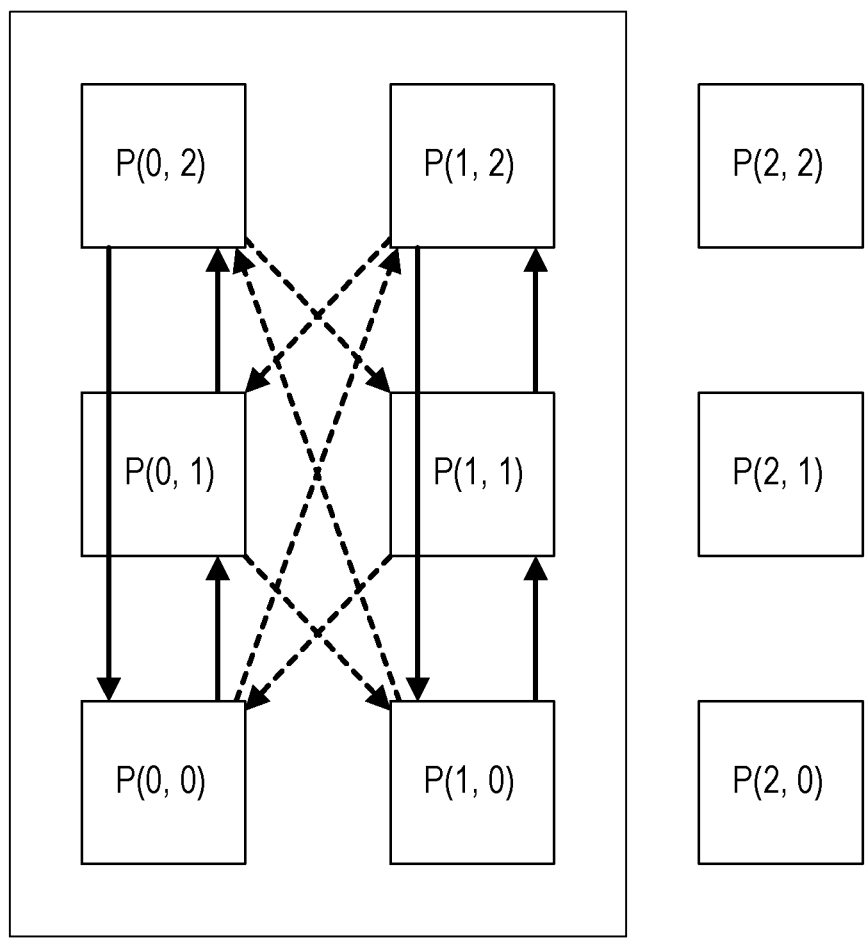
FIG. 23 is a diagram illustrating a relationship between all-to-all communication and a finite projective plane.

As an example, all-to-all communication in the phase group 0 of the second communication table (A) illustrated in FIG. 22 will be described with reference to FIGS. 23 and 24.

In the phase group 0, the gradient of the server with the allocated number 0 (here, referred to as a server "0") is ∞, and the number of hops is 1. The gradient of ∞ means that it is communication in the vertical direction. Accordingly, as illustrated in FIG. 23, the server "0" connected to the Leaf switch P(0,0) transmits data to the server "0" connected to the Leaf switch P(0,1), the server "0" connected to the Leaf switch P(0,1) transmits data to the server "0" connected to the Leaf switch P(0,2), and the server "0" connected to the Leaf switch P(0,2) transmits data to the server "0" connected to the Leaf switch P(0,0). The server "0" connected to the Leaf switch P(1,0) transmits data to the server "0" connected to the Leaf switch P(1,1), the server "0" connected to the Leaf switch P(1,1) transmits data to the server "0" connected to the Leaf switch P(1,2), and the server "0" connected to the Leaf switch P(1,2) transmits data to the server "0" connected to the Leaf switch P(1,0). In the phase group 0, the gradient of the server with the allocated number 1 (here, referred to as server "1") is 2, and the number of hops is 1. Accordingly, as illustrated in FIG. 23, the server "1" connected to the Leaf switch P(0,0) transmits data to the server "1" connected to the Leaf switch P(1,2), to the server "1" connected to the Leaf switch P(1,0), and the server "1" connected to the Leaf switch P(0,2) transmits data to the server "1" connected to the Leaf switch P(1,1). The server "1" connected to the Leaf switch P(1,0) transmits data to the server "1" connected to the Leaf switch P(0,2), the server "1" connected to the Leaf switch P(1,1) transmits data to the server "1" connected to the Leaf switch P(0,0), and the server "1" connected to the Leaf switch P(1,2) transmits data to the server "1" connected to the Leaf switch P(0,1).

Figure 24:
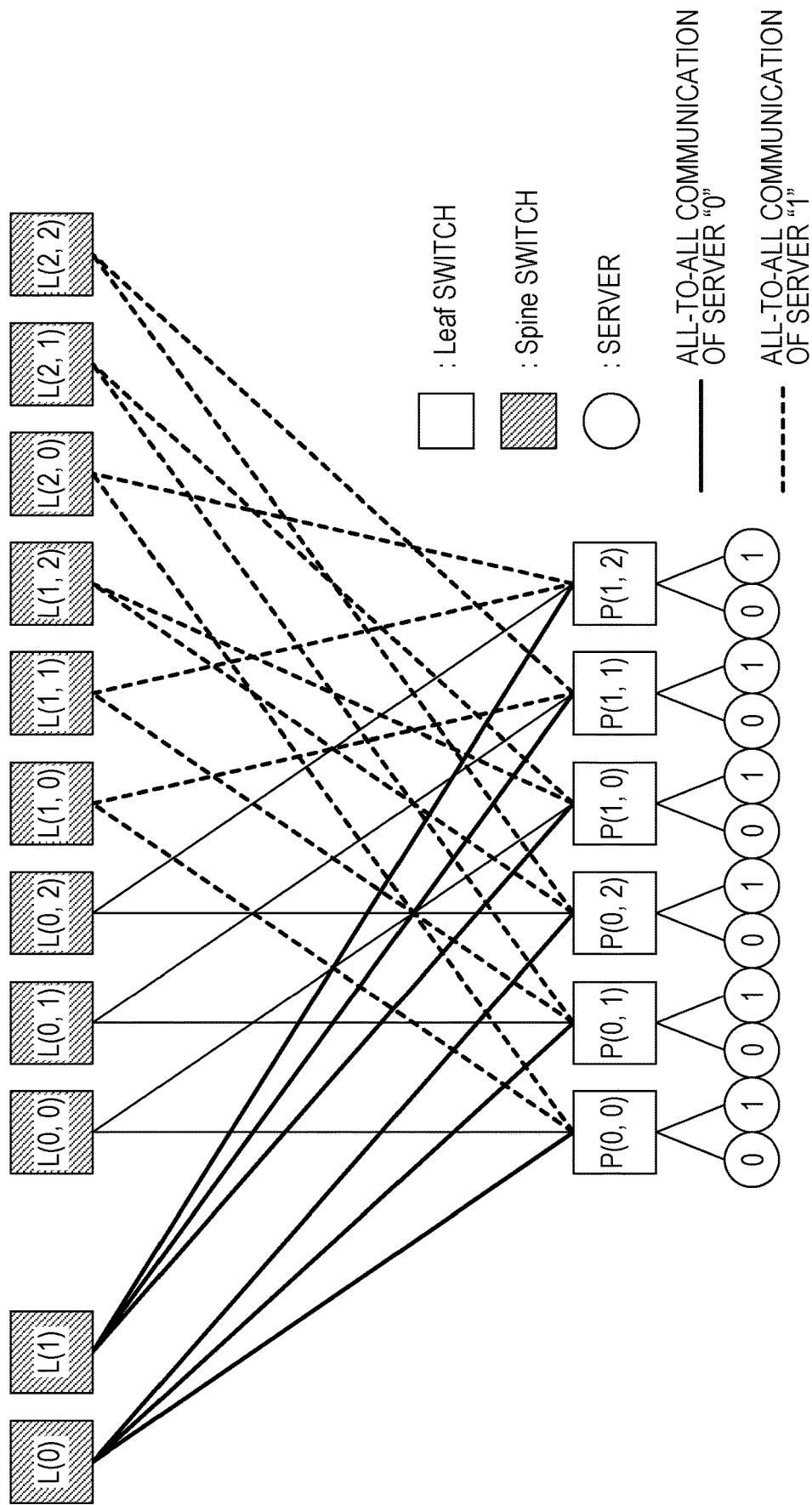
FIG. 24 illustrates Spine switches used in all-to-all communication.

FIG. 24 illustrates the Spine switches used for all-to-all communication. As illustrated in FIG. 24, the Spine switch L(0) and Spine switch L(1) are used by all-to-all communication executed by the server "0". The Spine switch L(1,0), the Spine switch L(1,1), the Spine switch L(1,2), the Spine switch L(2,0), the Spine switch L(2,1), and the Spine switch L(2,2) are used in the all-to-all communication executed by the server "1".

In the phase group 0, because a plurality of packets are not transmitted simultaneously in the same direction of one link, a route conflict does not occur. In the phase group 0, the server "0" connected to the Leaf switch P(0,0) transmits data to two servers connected to the Leaf switch P(0,1). Accordingly, in order to avoid occurrence of a route conflict, two phases are included in the phase group 0. Similarly, the phase group other than the phase group 0 also includes two phases.

Figure 25:
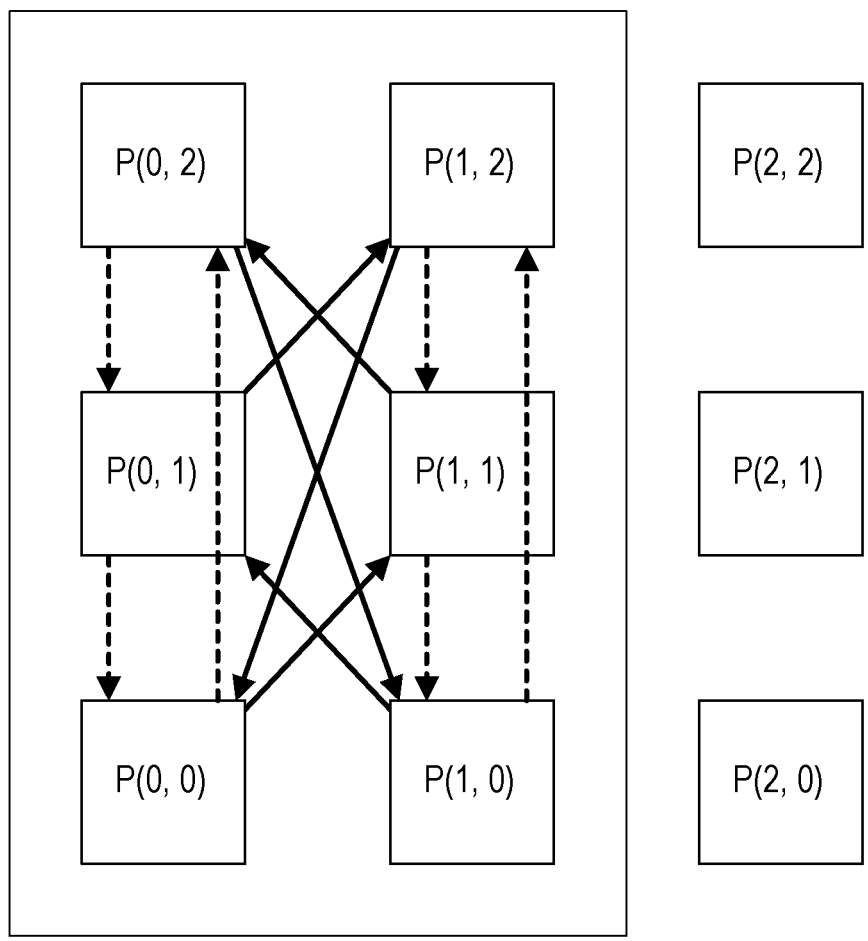
FIG. 25 is a diagram illustrating the relationship between the all-to-all communication and the finite projective plane.

As another example, all-to-all communication performed in the phase group 3 of the second communication table (A) illustrated in FIG. 22 will be described with reference to FIGS. 25 and 26.

In the phase group 3, the gradient for server "0" is 1 and the number of hops is 1. Accordingly, as illustrated in FIG. 25, the server "0" connected to the Leaf switch P(0,0) transmits data to the server "0" connected to the Leaf switch P(1,1), the server "0" connected to the Leaf switch P(0,1) transmits data to the server "0" connected to the Leaf switch P(1,2), and the server "0" connected to the Leaf switch P(0,2) transmits data to the server "0" connected to the Leaf switch P(1,0). The server "0" connected to the Leaf switch P(1,0) transmits data to the server "0" connected to the Leaf switch P(0,1), the server "0" connected to the Leaf switch P(1,1) transmits data to the server "0" connected to the Leaf switch P(0,2), and the server "0" connected to the Leaf switch P(1,2) transmits data to the server "0" connected to the Leaf switch P(0,0). In the phase group 3, the gradient for the server "1" is ∞ and the number of hops is 2. Accordingly, as illustrated in FIG. 25, the server "1" connected to the Leaf switch P(0,0) transmits data to the server "1" connected to the Leaf switch P(0,2), the server "1" connected to the Leaf switch P(0,1) transmits data to the server "1" connected to the Leaf switch P(0,0), and the server "1" connected to the Leaf switch P(0,2) transmits data to the server "1" connected to the Leaf switch P(0,1). The server "1" connected to the Leaf switch P(1,0) transmits data to the server "1" connected to the Leaf switch P(1,2), the server "1" connected to the Leaf switch P(1,1) transmits data to the server "1" connected to the Leaf switch P(1,0), and the server "1" connected to the Leaf switch P(1,2) transmits data to the server "1" connected to the Leaf switch P(1,1).

Figure 26:
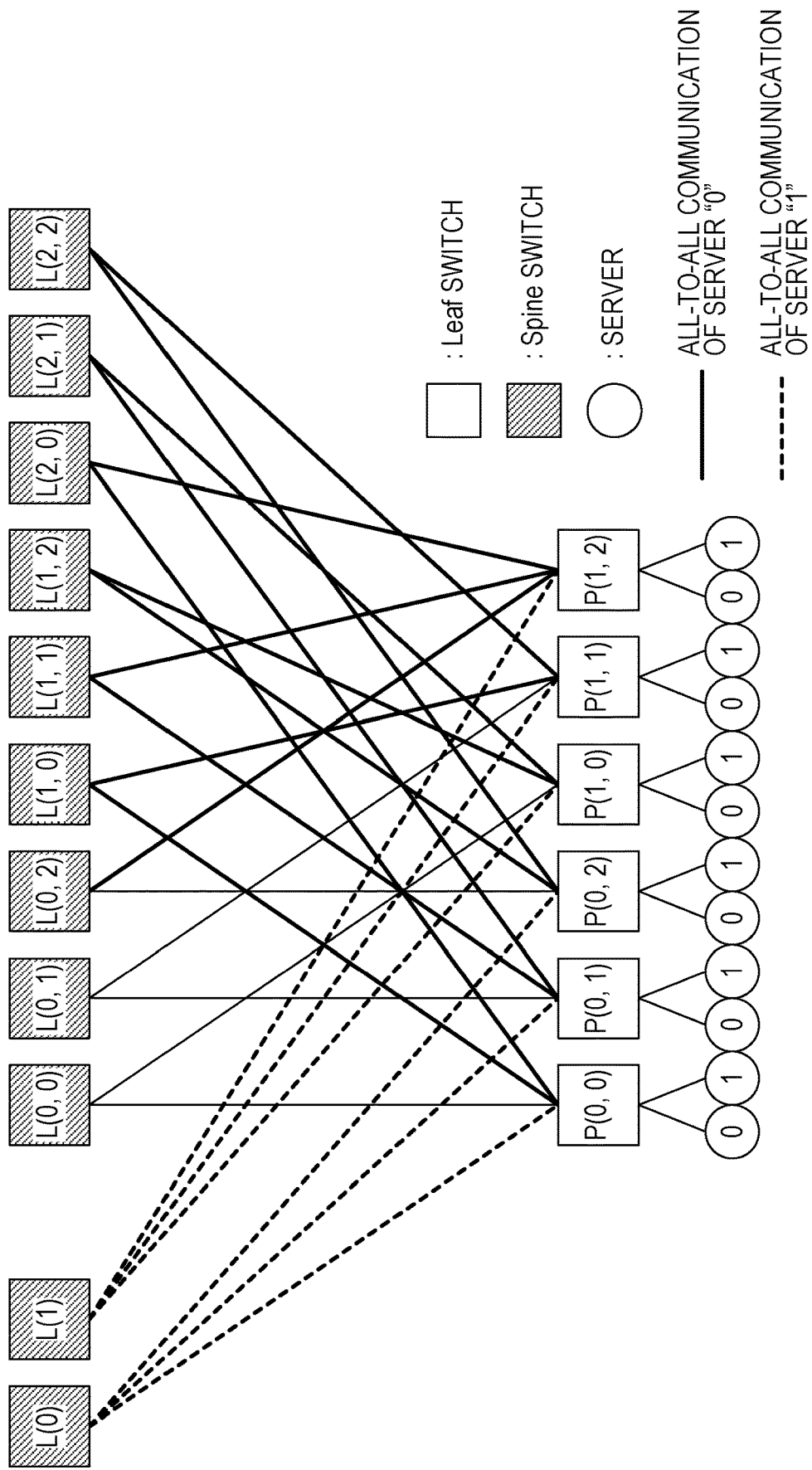
FIG. 26 is a diagram illustrating Spine switches used in the all-to-all communication.

FIG. 26 illustrates the Spine switches used for all-to-all communication. As illustrated in FIG. 26, the Spine switch L(1,0), the Spine switch L(1,1), the Spine switch L(1,2), the Spine switch L(2,0), the Spine switch (2,1), and the Spine switch (2,2) are used in the all-to-all communication executed by the server "0". The Spine switch L(0) and the Spine switch L(1) are used in the all-to-all communication executed by the server "1".

In the phase group 3, because a plurality of packets are not transmitted simultaneously in the same direction of one link, a route conflict does not occur.

Figure 27:
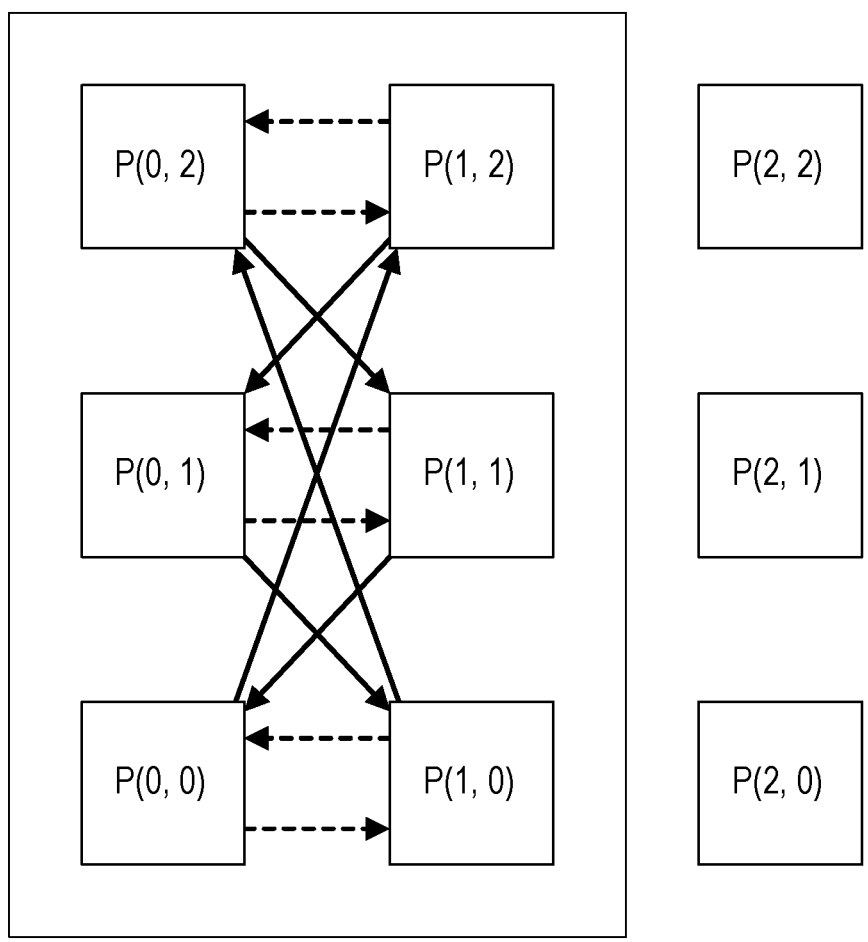
FIG. 27 is a diagram illustrating the relationship between all-to-all communication and the finite projective plane.

As another example, all-to-all communication performed in the phase group 4 of the second communication table (A) illustrated in FIG. 22 will be described with reference to FIGS. 27 and 28.

In the phase group 4, the gradient for server "0" is 2 and the number of hops is 1. Accordingly, as illustrated in FIG. 27, the server "0" connected to the Leaf switch P(0,0) transmits data to the server "0" connected to the Leaf switch P(1,2), the server "0" connected to the Leaf switch P(0,1) transmits data to the server "0" connected to the Leaf switch P(1,0), and the server "0" connected to the Leaf switch P(0,2) transmits data to the server "0" connected to the Leaf switch P(1,1). The server "0" connected to the Leaf switch P(1,0) transmits data to the server "0" connected to the Leaf switch P(0,2), the server "0" connected to the Leaf switch P(1,1) transmits data to the server "0" connected to the Leaf switch P(0,0), and the server "0" connected to the Leaf switch P(1,2) transmits data to the server "0" connected to the Leaf switch P(0,1). Also, in the phase group 4, the gradient for server "1" is 0 and the number of hops is 1. Accordingly, as illustrated in FIG. 27, the server "1" connected to the Leaf switch P(0,0) transmits data to the server "1" connected to the Leaf switch P(1,0), the server "1" connected to the Leaf switch P(0,1) transmits data to the server "1" connected to the Leaf switch P(1,1), and the server "1" connected to the Leaf switch P(0,2) transmits data to the server "1" connected to the Leaf switch P(1,2). The server "1" connected to the Leaf switch P(1,0) transmits data to the server "1" connected to the Leaf switch P(0,0), the server "1" connected to the Leaf switch P(1,1) transmits data to the server "1" connected to the Leaf switch P(0,1), and the server "1" connected to the Leaf switch P(1,2) transmits data to the server "1" connected to the Leaf switch P(0,2).

Figure 28:
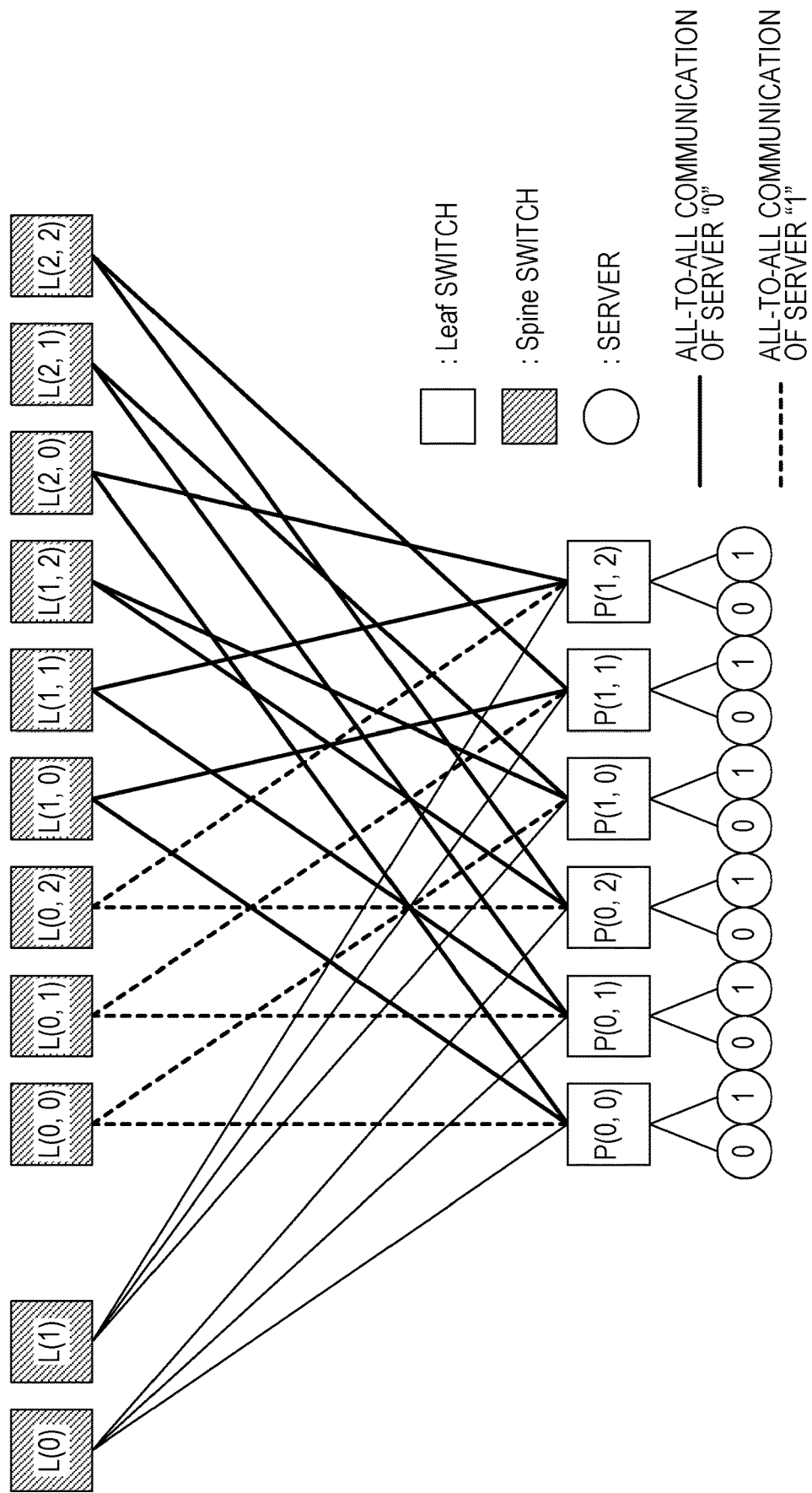
FIG. 28 is a diagram illustrating Spine switches used in the all-to-all communication.

FIG. 28 illustrates the Spine switches used for all-to-all communication. As illustrated in FIG. 28, the Spine switch L(1,0), the Spine switch L(1,1), the Spine switch L(1,2), the Spine switch L(2,0), the Spine switch (2,1), and the Spine switch (2,2) are used in the all-to-all communication executed by the server "0". The Spine switch L(0,0), the Spine switch L(0,1), and the Spine switch (0,2) are used in the all-to-all communication executed by the server "1".

In the phase group 4, because a plurality of packets are not transmitted simultaneously in the same direction of one link, a route conflict does not occur.

Referring back to FIG. 21, the second generation part 3013 identifies a phase group, at which Allreduce communication is executable, among respective phase groups of all-to-all communication and the gradient usable in the phase group (Step S33).

FIG. 29 is a diagram illustrating a phase group at which Allreduce communication is executable and the gradient usable in the phase group. Here, it is assumed that the gradients "0" and "∞" are used for Allreduce communication. Numbers outside the brackets represent the gradient, and numbers in the brackets represent the number of hops. In the example of FIG. 29, because the gradients "0" and "∞" are used for the all-to-all communication only in the phase group 2, the Allreduce communication may be executed in the phase groups other than the phase group 2. Because the gradients "2" and "∞" are used for the all-to-all communication in the phase group 0, it is possible to use the gradient "0" for Allreduce communication. Because the gradient "∞" is used for the all-to-all communication in the phase group 1, it is possible to use the gradient "0" for Allreduce communication. Because the gradients "1" and "∞" are used for the all-to-all communication in the phase group 3, it is possible to use the gradient "0" for Allreduce communication. Because the gradients "0" and "2" are used for the all-to-all communication in the phase group 4, it is possible to use the gradient "∞" for Allreduce communication. Because the gradients "1" is used for the all-to-all communication in the phase group 5, it is possible to use the gradient "∞" for Allreduce communication.

Figure 30:
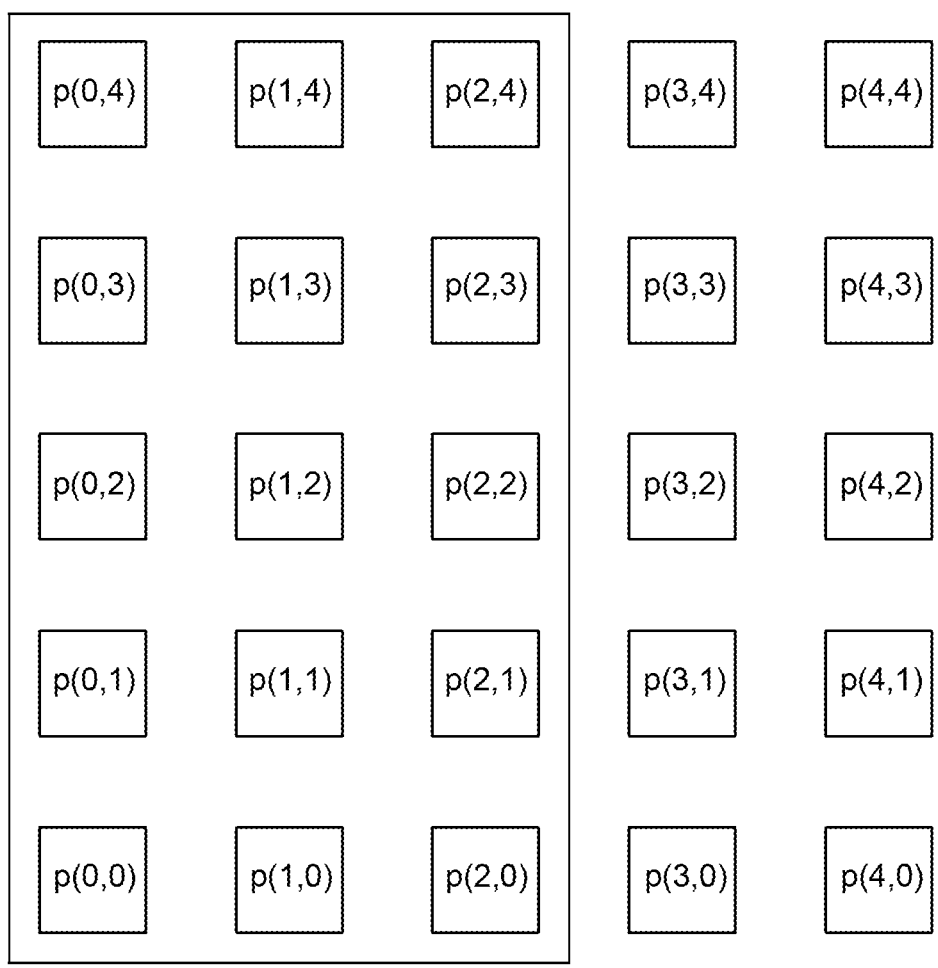
FIG. 30 is a diagram illustrating another example of a rectangular area.

As another example, it is assumed that that there is a Latin square fat tree system having a size of the lattice portion of 5*5, and the rectangular area is set for that lattice part as illustrated in FIG. 30. Also, in such a case, a phase group at which Allreduce communication is executable among the respective phase groups of all-to-all communication and a gradient usable in the phase group are identified by the same method as illustrated in FIG. 31, for example.

Referring back to the descriptions of FIGS. 10 and 21, the second generation part 3013 generates the second communication table (B) including communication information on Allreduce communication at the first gradient (for example, 0) and Allreduce communication at the second gradient (for example, ∞) (Step S35).

FIG. 32 is a diagram illustrating an example of the second communication table (B). In the example of FIG. 32, for each phase group, communication information on Allreduce executed by a server (here, referred to as server "2"), of which the allocated number is "2", among the servers connected to the execution switch, for each phase group is stored. Because the second communication table (B) is a communication table for Allreduce communication, it may be generated by the same method as the first communication table.

Allreduce between the servers connected to different Leaf switches in a rectangular area is realized by Allreduce communication for two different gradients. In the example of FIG. 32, Allreduce between the servers connected to the different Leaf switches in the rectangular area is realized by Allreduce at the gradient "0" and Allreduce at the gradient "∞". In general, the number of phases of all-to-all communication executed by x servers is O(x) and the number of Allreduce communication phases executed by the x servers is O(log(x)) (base is 2) and thus, it is possible to complete Allreduce communication during execution of all-to-all communication.

Figure 33:
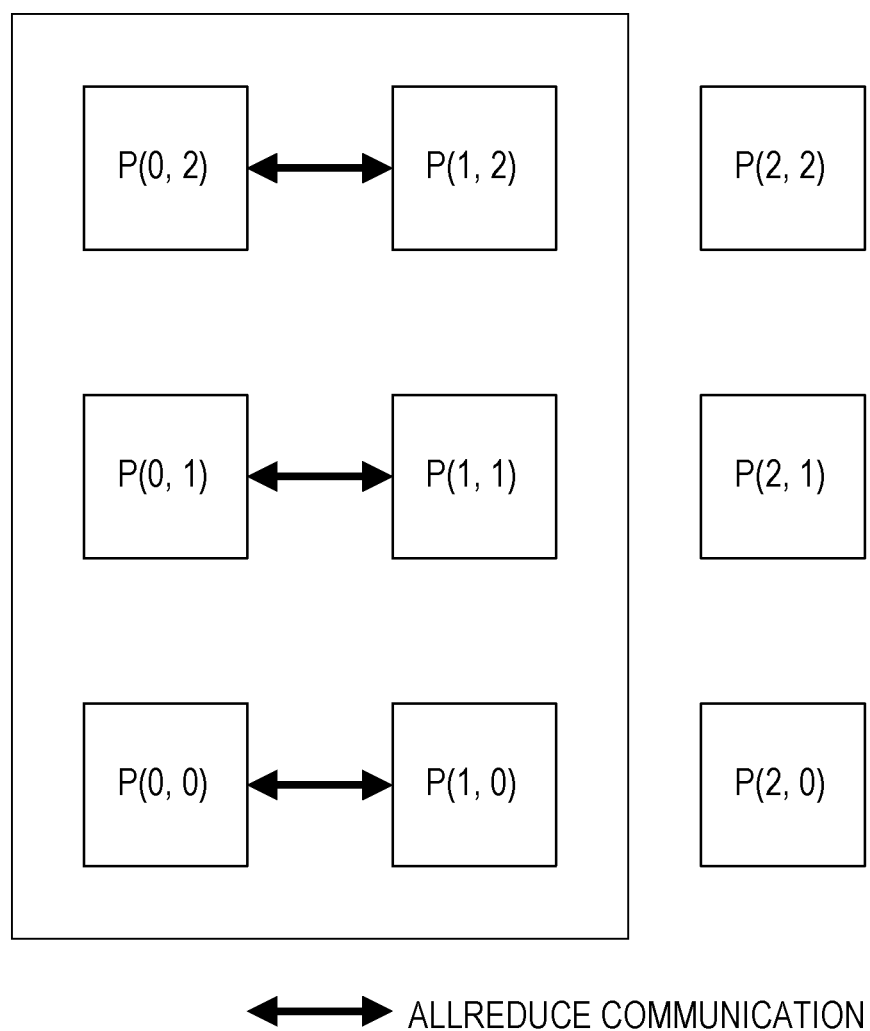
FIG. 33 is a diagram illustrating Allreduce.

FIG. 33 is a diagram illustrating Allreduce for the gradient "0". By executing Allreduce for the gradient "0", the server "2" connected to the Leaf switch P (0,0) and the server "2" connected to the Leaf switch P (1,0) have the same result. The server "2" connected to the Leaf switch P (0,1) and the server "2" connected to the Leaf switch P (1,1) have the same result. The server "2" connected to the Leaf switch P (0,2) and the server "2" connected to the Leaf switch P (1,2) have the same result.

Figure 34:
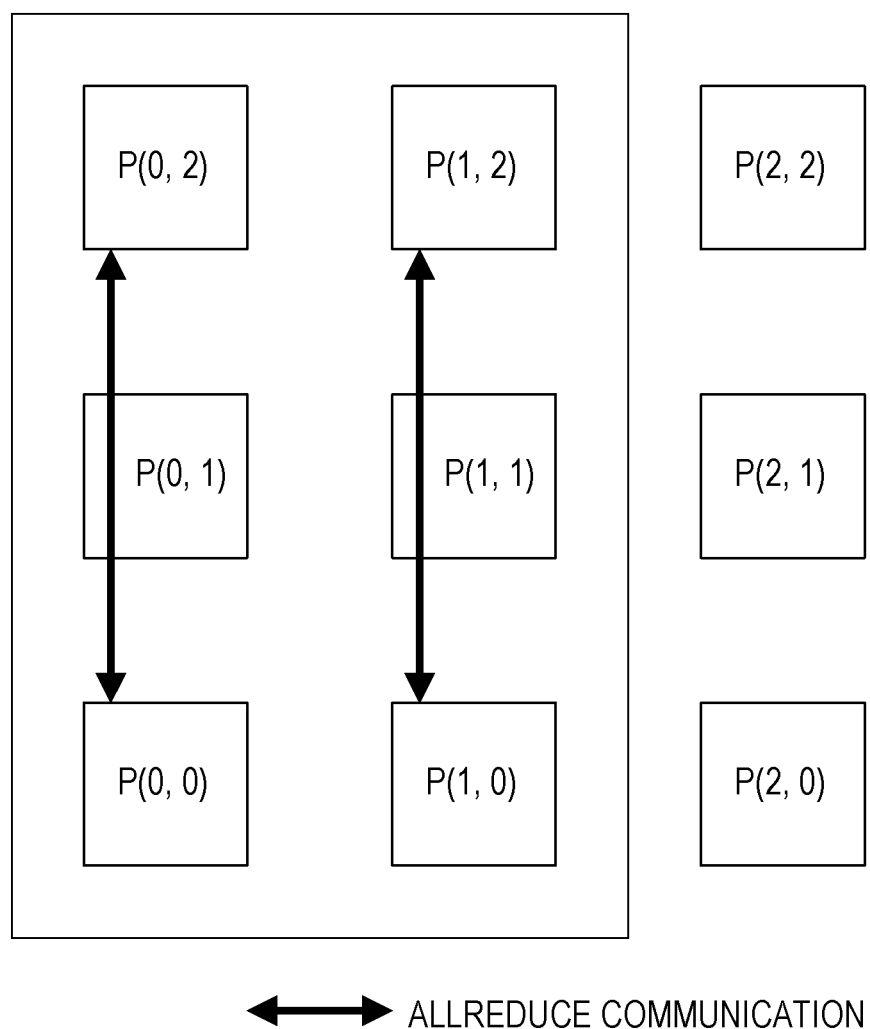
FIG. 34 is a diagram illustrating the Allreduce.

FIG. 34 is a diagram illustrating Allreduce for the gradient "∞". By executing Allreduce for the gradient "∞", the server "2" connected to the Leaf switch P (0,0), the server "2" connected to the Leaf switch P (0,1) and the server "2" connected to the Leaf switch P (0,2) have the same result. The server "2" connected to the Leaf switch P (1,0), the server "2" connected to the Leaf switch P (1,1), and the server "2" connected to the Leaf switch P (1,2) have the same result.

Accordingly, the server "2" of each execution switch has the same result in a rectangular area by executing Allreduce for the gradient "0" and Allreduce for the gradient "∞".

Figure 35:
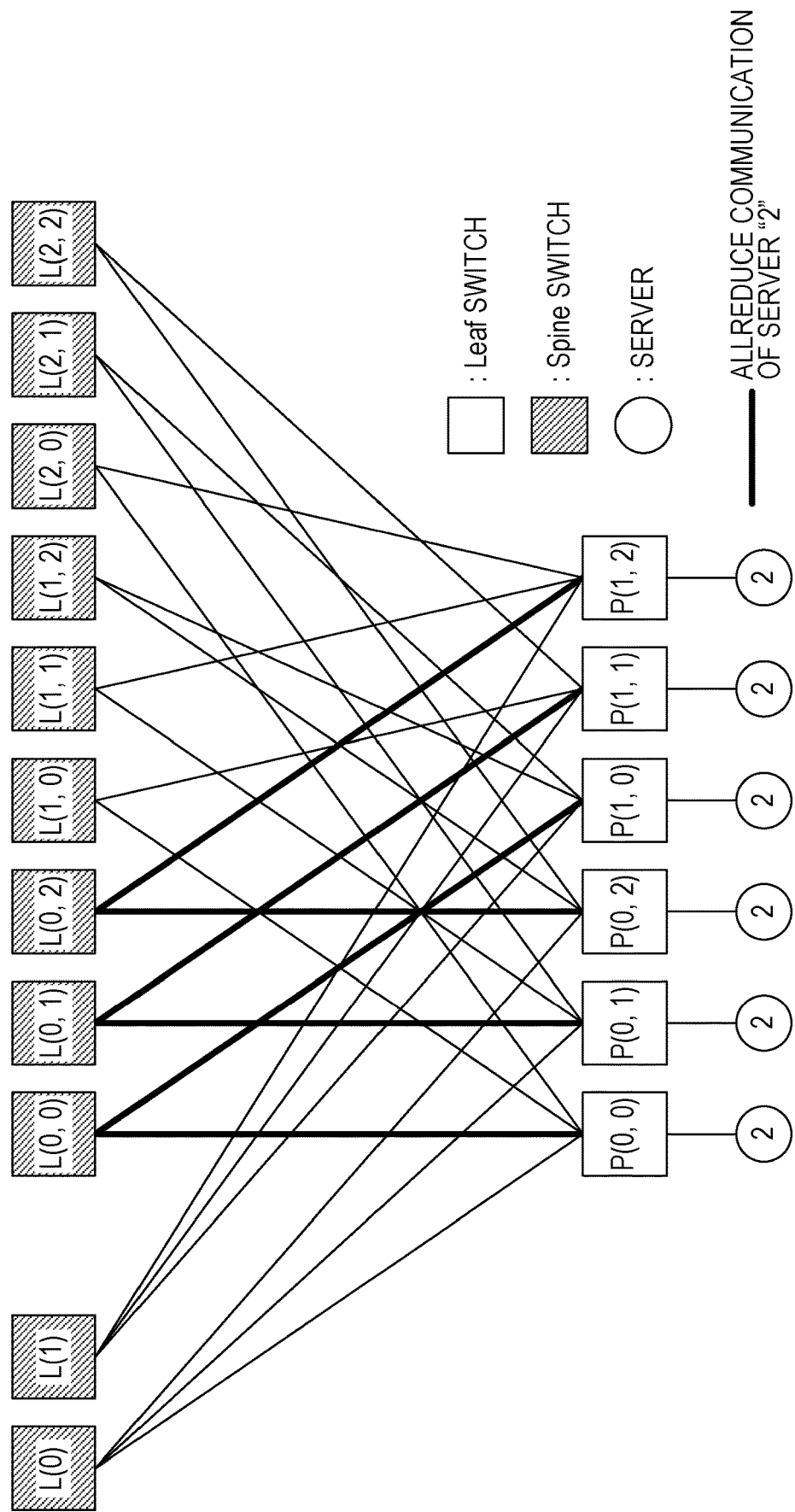
FIG. 35 is a diagram illustrating the Spine switches used in Allreduce communication.

FIG. 35 is a diagram illustrating Spine switches used by Allreduce communication executed in the phase group 0 illustrated in the second communication table (B) of FIG. 32. As illustrated in FIG. 35, in the phase group 0, the Spine switch L(0,0), the Spine switch L(0,1), and the Spine switch L(0,2) are used in Allreduce communication of the server "2". As is apparent from a comparison with FIG. 24, because the Spine switch used by all-to-all communication is different from the Spine switch used by Allreduce communication, a route conflict does not occur.

Figure 36:
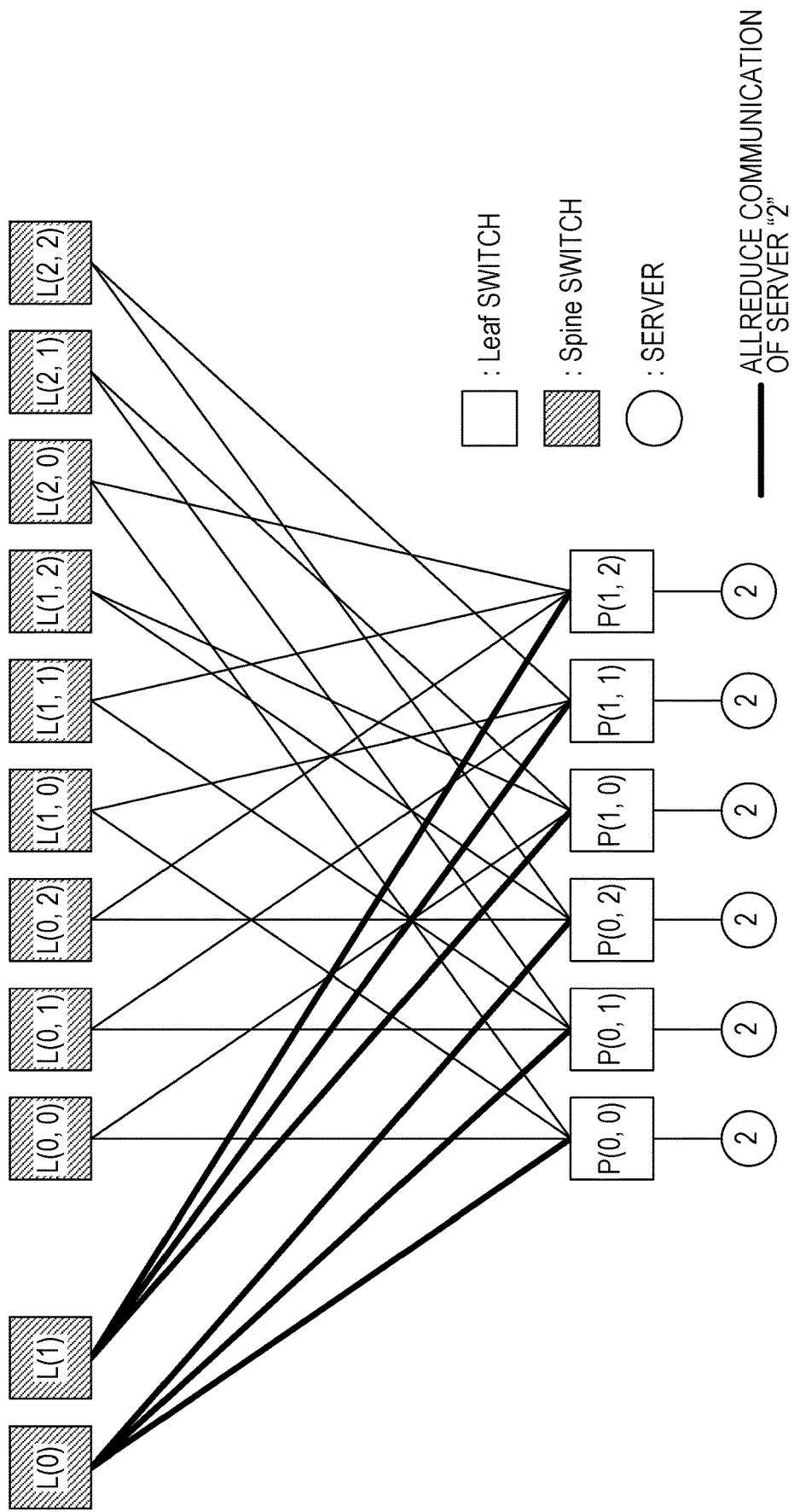
FIG. 36 is a diagram illustrating the Spine switches used in the Allreduce communication.

FIG. 36 is a diagram illustrating Spine switches used by Allreduce communication executed in the phase group 4 illustrated in the second communication table (B) of FIG. 32. As illustrated in FIG. 36, in the phase group 0, the Spine switch L(0) and the Spine switch L(1) are used in Allreduce communication of the server "2". As is apparent from the comparison with FIG. 28, because the Spine switch used by all-to-all communication is different from the Spine switch used by Allreduce communication, a route conflict does not occur.

Referring back to the descriptions of FIGS. 10 and 21, the second generation part 3013 stores the second communication table (A) and the second communication table (B) in the communication table storing unit 303 (Step S37). Then, the process illustrated in FIG. 12 is continued.

As described above, in the second generation process, the second communication table (A) and the second communication table (B) used for executing all-to-all communication and Allreduce communication in parallel are generated.

Figure 37:
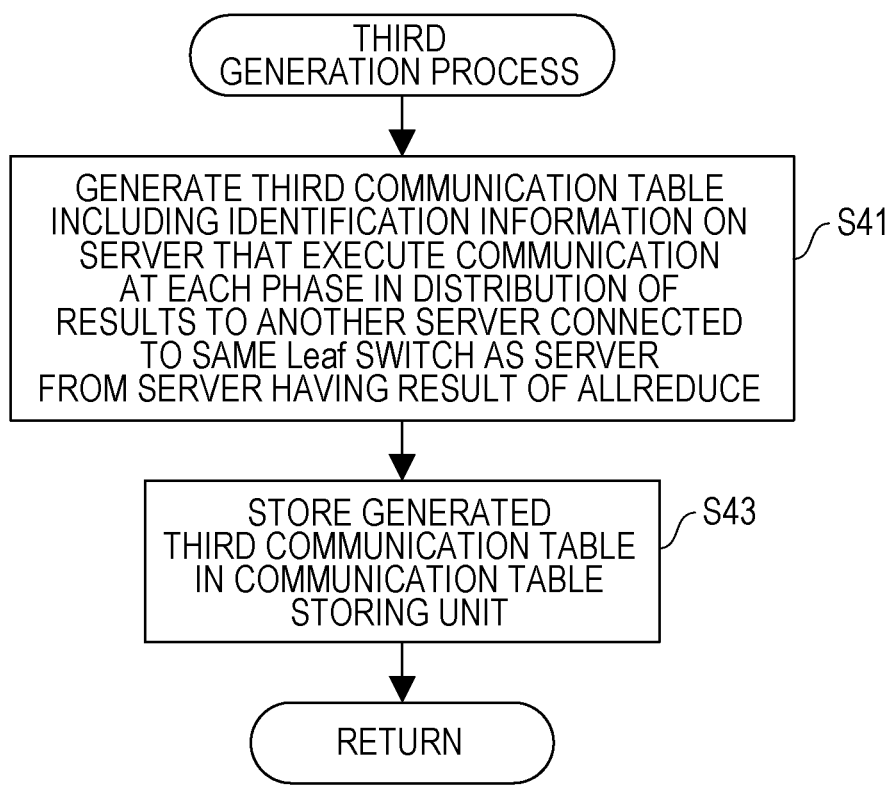
FIG. 37 is a diagram illustrating a process flow of a third generation process.

Next, a third generation process will be described with reference to FIGS. 37 to 40. FIG. 37 is a diagram illustrating a process flow of the third generation process.

The third generation part 3015 illustrated in FIG. 10 generates a third communication table including identification information of a server that executes communication at each phase in distribution of results to another server connected to the same Leaf switch as a server "2" from the server "2" (Step S41 in FIG. 37).

Figure 38:
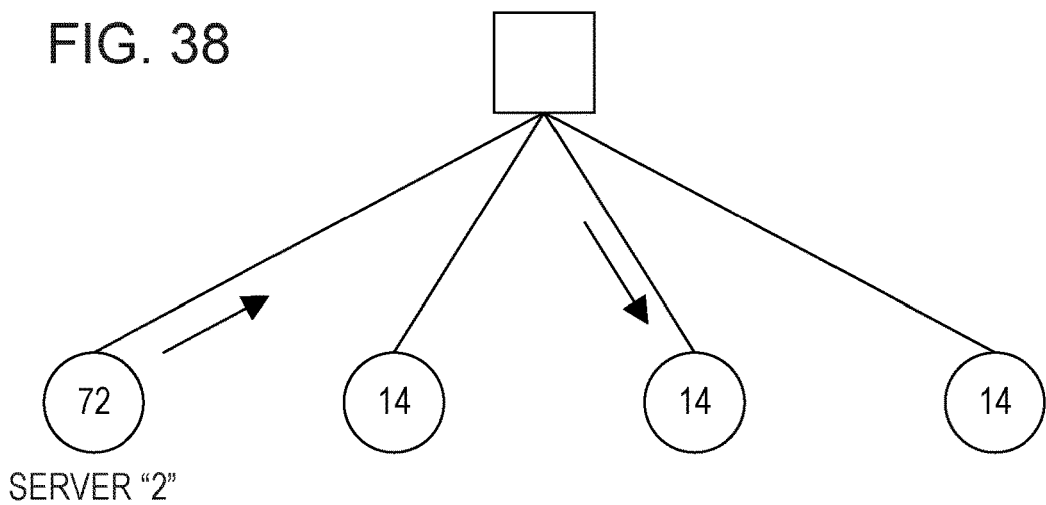
FIG. 38 is a diagram illustrating distribution of results realized in a third communication table.
Figure 39:
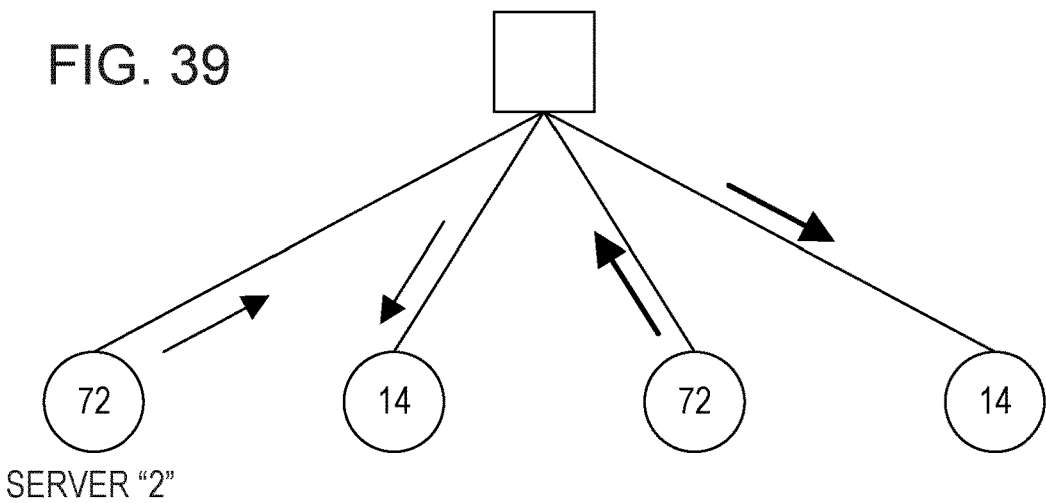
FIG. 39 is a diagram illustrating the distribution of results realized in the third communication table.
Figure 40:
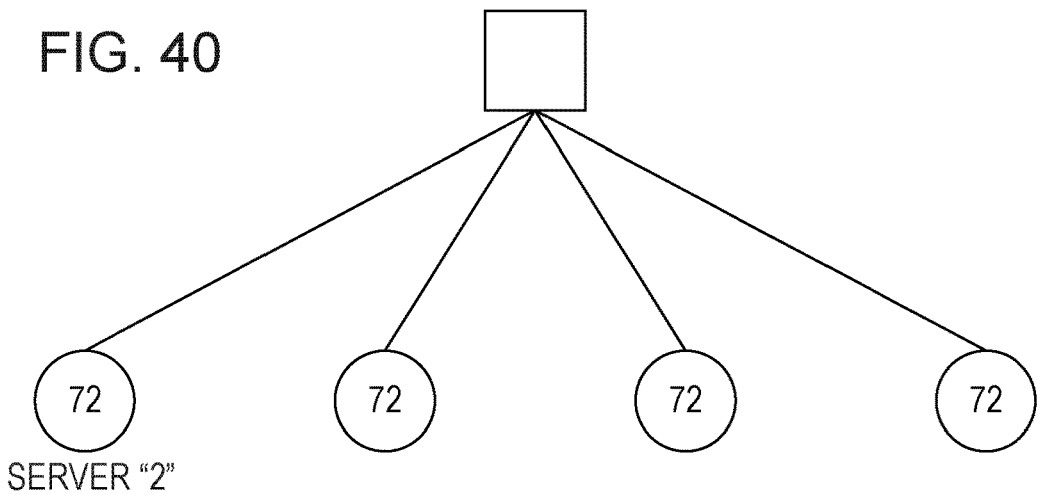
FIG. 40 is a diagram illustrating the distribution of results realized in the third communication table.

FIG. 38 to FIG. 40 illustrate a distribution of results realized by the third communication table. In FIG. 38 to FIG. 40, as an example, one Leaf switch and four servers connected to the Leaf switch are illustrated, and the server located at the leftmost is the server "2". First, as illustrated in FIG. 38, the server "2" transmits a value "72" to the second server from the right.

Then, as illustrated in FIG. 39, the server "2" and the second server from the right have the value "72", and the first server from the right and the third server from the right have a value "14". Then, as illustrated in FIG. 39, the server "2" transmits the value "72" to the third server from the right, and the second server from the right transmits the value "72" to the first server from the right.

Then, as illustrated in FIG. 40, each server has the value "72" which is the result of Allreduce. As described above, distribution of results by the third communication table is realized. The number of phases is 2 and there is no link where a plurality of packets are transmitted simultaneously in the same direction in any phase and thus, a route conflict does not occur.

Referring back to the descriptions of FIGS. 10 and 37, the third generation part 3015 stores the third communication table generated in Step S41 in the communication table storing unit 303 (Step S43). Then the process illustrated in FIG. 12 is continued. In the third communication table, communication information on the distribution of results in each execution switch is stored in the same format as the first communication table illustrated in FIG. 20 and thus, a detailed description thereof is omitted here.

Next, a process executed by the server will be described with reference to FIGS. 41 to 43. This process is a process executed by each server that receives the first to third communication tables from the management apparatus 3.

Figure 41:
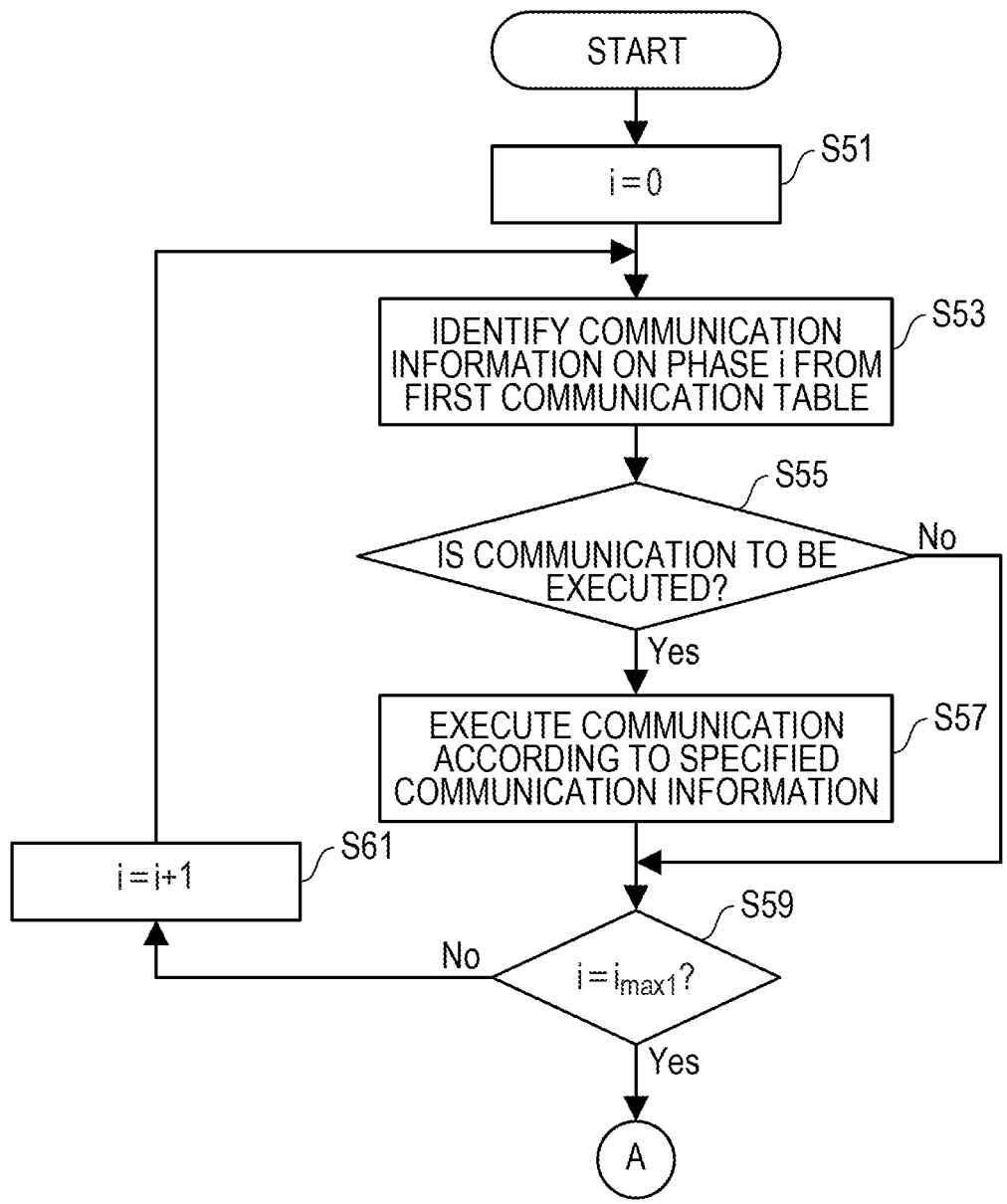
FIG. 41 is a diagram illustrating a process flow of a process executed by a server.

FIG. 41 is a diagram illustrating a process flow of the process executed by the server and is also described with reference to FIG. 11.

The first communication part 1011 in the server sets a variable i representing the phase number to 0 (Step S51 in FIG. 41). The variable i is stored in the phase data storing unit 105.

The first communication part 1011 identifies communication information of the phase i from the first communication table stored in the communication table storing unit 103 (Step S53).

The first communication part 1011 determines whether the server (that is, the server that is executing this process) to which the first communication part 1011 belongs executes communication at the phase i (Step S55). Whether or not the server, to which the first communication part 1011 belongs, executes communication at the phase i is determined depending on whether identification information of the server, to which the first communication part 1011 belongs, is included in identified communication information or not.

In a case where it is determined that the server, to which the first communication part 1011 belongs, does not execute communication at the phase i (No route in Step S55), the process proceeds to Step S59. On the other hand, in a case where it is determined that the server, to which the first communication part 1011 belongs, executes communication at the phase i (Yes route in Step S55), the first communication part 1011 executes communication according to communication information identified in Step S53 (Step S57).

As described above, communication performed according to the first communication table is Allreduce communication between servers connected to the same Leaf switch, and a server that receives a value from another server executes computation related to Allreduce.

The first communication part 1011 determines whether $i=i_{max1}$ is established (Step S59). The $i_{max1}$ is the maximum value of the phase number of communication performed according to the first communication table. In a case where it is determined that $i=i_{max1}$ is not established (No route in Step S59), the first communication part 1011 increments i by 1 (Step S61). Then, the process proceeds to Step S53. The end of the phase is confirmed by barrier synchronization.

Figure 42:
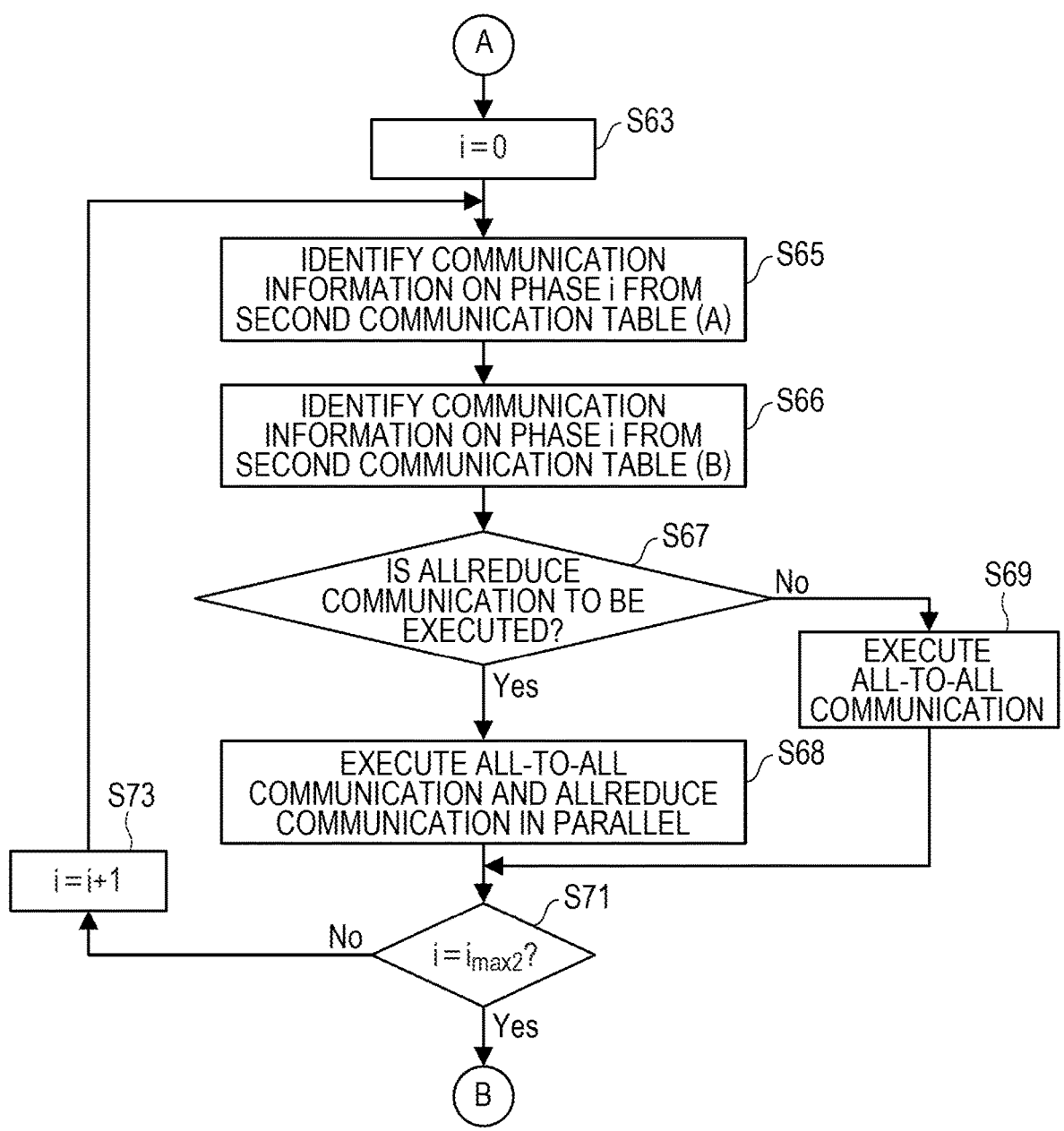
FIG. 42 is a diagram illustrating the process flow of the process executed by the server.

On the other hand, in a case where it is determined that $i=i_{max1}$ is established (Yes route in Step S59), the process proceeds to Step S63 in FIG. 42.

The processing unit 101 sets the variable i representing the phase number to 0 (Step S63 in FIG. 42).

The processing unit 101 identifies communication information at the phase i from the second communication table (A) stored in the communication table storing unit 103 (Step S65) and identifies communication information at the phase i from the second communication table (B) stored in the communication table storing unit 103 (Step S66).

The processing unit 101 determines whether the server (that is, the server that is executing this process), to which the processing unit 101 belongs, executes communication at the phase i (Step S67). Whether or not the server, to which the processing unit 101 belongs, executes Allreduce communication at the phase i is determined depending on whether identification information of the server, to which the processing unit 101 belongs, is included in communication information identified from the second communication table (B).

In a case where it is determined that the server, to which the processing unit 101 belongs, does not execute Allreduce communication at the phase i (No route in Step S67), the processing unit 101 calls the second communication part 1013. Then, the second communication part 1013 executes all-to-all communication according to the communication information identified at Step S65 (Step S69). Then, the process proceeds to Step S71. On the other hand, in a case where it is determined that the server, to which the processing unit 101 belongs, executes Allreduce communication at the phase i (Yes route in Step S67), the processing unit 101 calls the second communication part 1013 and the third communication part 1015. Then, the second communication part 1013 executes all-to-all communication according to the communication information identified in Step S65, and in parallel, the third communication part 1015 executes Allreduce communication according to the communication information identified at Step S66 (Step S68).

The processing unit 101 determines whether $i=i_{max2}$ is established (Step S71). The $i_{max2}$ is the maximum value of the phase number of communication performed according to the second communication table (A) and the second communication table (B). In a case where it is determined that $i=i_{max2}$ is not established (No route in Step S71), the processing unit 101 increments i by 1 after barrier synchronization by the second communication part 1013 and barrier synchronization by the third communication part 1015 are ended (Step S73). Then, the process proceeds to Step S65.

Figure 43:
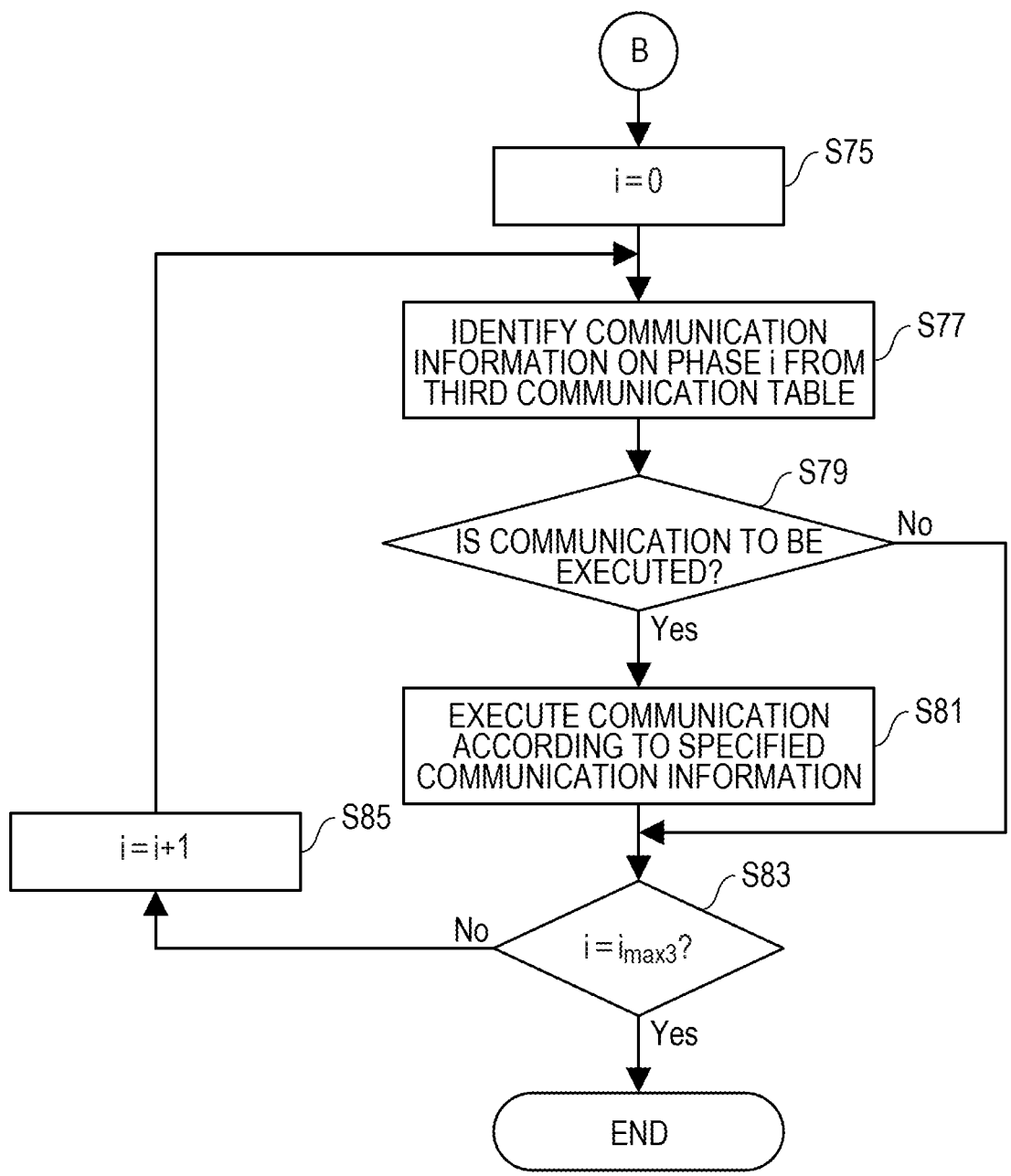
FIG. 43 is a diagram illustrating the process flow of the process executed by the server.

On the other hand, in a case where it is determined that $i=i_{max2}$ is established (Yes route in Step S71), the process proceeds to Step S75 FIG. 43.

The fourth communication part 1017 sets the variable i=max representing the phase number to 0 (Step S75 in FIG. 43).

The fourth communication part 1017 identifies communication information on the phase i from the third communication table stored in the communication table storing unit 103 (Step S77).

The fourth communication part 1017 determines whether the server (that is, the server that is executing this process), to which the fourth communication part 1017 belongs, executes communication at the phase i (Step S79). Whether or not the server, to which the fourth communication part 1017 belongs, executes Allreduce communication at the phase i is determined depending on whether identification information of the server, to which the fourth communication part 1017 belongs, is included in identified communication information.

In a case where it is determined that the server, to which the fourth communication part 1017 belongs, does not execute communication at the phase i (No route in Step S79), the process proceeds to Step S83. On the other hand, in a case where it is determined that the server, to which the fourth communication part 1017 belongs, executes communication at the phase i (Yes route in Step S79), the fourth communication part 1017 executes communication according to the communication information identified in Step S77 (Step S81).

As described above, communication performed according to the third communication table is a distribution of results from a server having the result of Allreduce to another server connected to the same Leaf switch as the server.

The fourth communication part 1017 determines whether $i=i_{max3}$ is established (Step S83). The $i_{max3}$ is the maximum value of the phase number of communication performed according to the third communication table. In a case where it is determined that $i=i_{max3}$ is not established (No route in Step S83), the fourth communication part 1017 increments i by 1 (Step S85). Then, the process proceeds to Step S77. The end of the phase is confirmed by barrier synchronization.

On the other hand, in a case where it is determined that $i=i_{max3}$ is established (Yes route in Step S83), the process is ended.

As described above, in the example described above, a server with an allocated number of "0" or "1" may execute all-to-all communication, while a server with an allocated number of "2" may execute Allreduce communication. Thus, according to the method Embodiment 1, a plurality of collective communication may be executed in parallel by using a specific Leaf switch group in the Latin square fat tree system 1000.

As described above, in Embodiment 1, a route conflict does not occur in each operation of Allreduce communication.

Embodiment 2

In Embodiment 1, all-to-all communication and Allreduce communication are executed in parallel, but Allreduce communication of certain computations and Allreduce communication of another computation may be executed in parallel.

Figure 44:
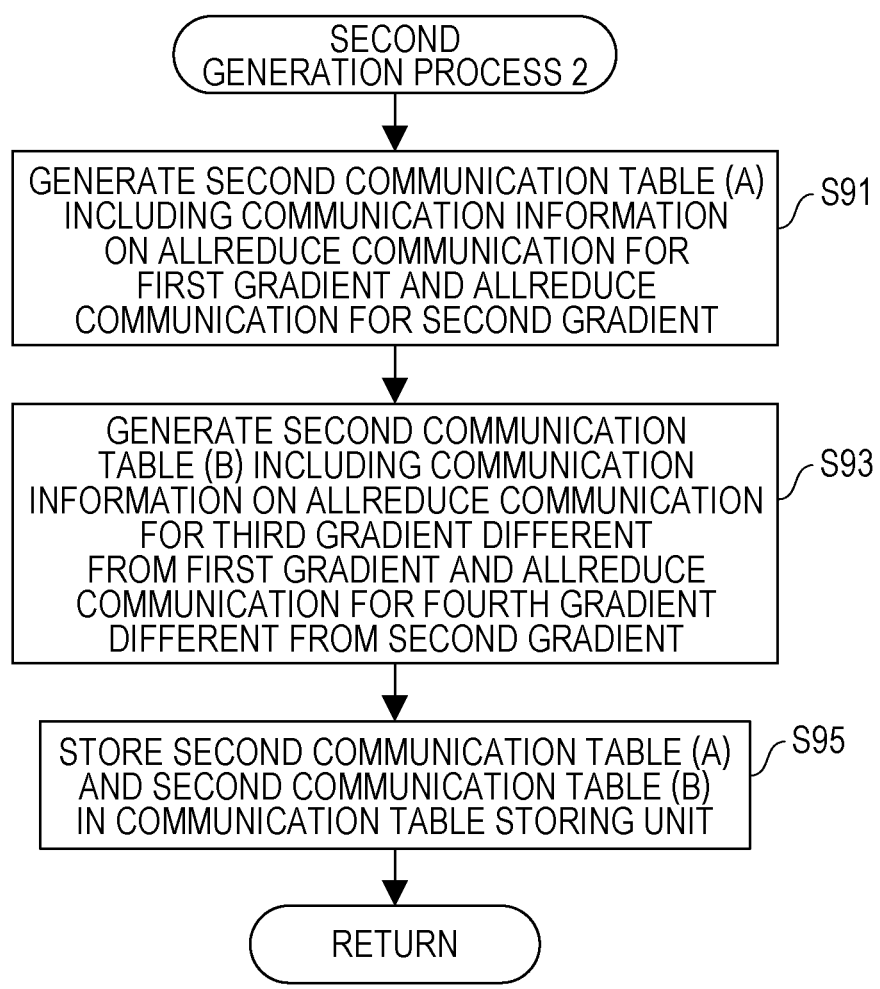
FIG. 44 is a diagram illustrating a process flow of a second generation process according to Embodiment 2.

FIG. 44 is a diagram illustrating a process flow of a second generation process of Embodiment 2 and is also described with reference to FIG. 10.

First, the second generation part 3013 generates the second communication table (A) including communication information on Allreduce communication for the first gradient (for example, 0) and Allreduce communication for the second gradient (for example, ∞) (Step S91 in FIG. 44).

The second generation part 3013 generates the second communication table (B) including communication information on Allreduce communication for a third gradient (for example, 1 or ∞) different from the first gradient and Allreduce communication for a fourth gradient (for example, 0 or 1) different from the second gradient (Step S93).

The second generation part 3013 stores the second communication table (A) and the second communication table (B) in the communication table storing unit 303 (Step S95). Then, the process illustrated in FIG. 12 is continued.

When the process described is executed, a route conflict does not occur even when Allreduce communication for the first gradient and Allreduce communication for the third gradient are executed in parallel and also, a route conflict does not occur even when Allreduce communication for the second gradient and Allreduce communication for the fourth gradient are executed in parallel. Accordingly, Allreduce communication (for example, Allreduce communication of which computation is addition) realized by the second communication table (A) and Allreduce communication (for example, Allreduce communication of which computation is multiplication) realized by the second communication table (B) may be executed in parallel without causing a route conflict.

Although the embodiments has been described above, the present disclosure is not limited thereto. For example, the configurations of the functional blocks of the management apparatus 3 and the server described above may not match configurations of actual program modules.

The configuration of each table described above is only an example, and each table may not have a configuration as described above. Furthermore, also in the process flow, when a process result does not change, it is also possible to change the order of processing in the process. Further, processing may be made to execute in parallel in the process.

In Embodiment 1, addition is performed as Allreduce computation, but computations other than addition (for example, multiplication) may be performed.

In the example described above, Allreduce is realized by a combination of the gradient "0" and the gradient "∞", but Allreduce may be realized by a combination of two other different gradients.

APPENDIX

In this annex, a Latin square fat tree and a finite projective plane will be described.

Figure 45:
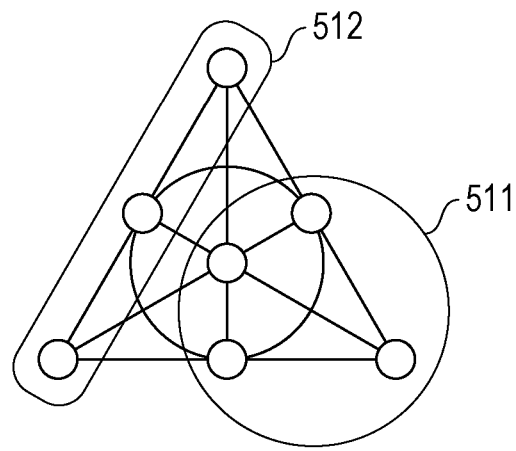
FIG. 45 is a diagram illustrating a Latin square fat tree and a finite projective plane.

The finite projective plane corresponds to a plane obtained by adding several points at infinity to an ordinary plane and removing "two parallel straight lines". FIG. 45 illustrates a structure of the finite projective plane when the order (hereinafter, referred to as n) is 2 and the number of ports is 6 (=2(n+1)). In FIG. 45, 3 (=n+1) Leaf switches surrounded by a frame 512 correspond to the points at infinity.

On the finite projective plane, one point P is set, n points P(c) (c=0, 1, . . . , n−1) are set, and $n^2$ points P(c, r) (c, r=0, 1, . . . , n−1) are set. Also, one straight line L={P, P(0), . . . , P(n−1)} are set, n straight lines L={P, P(c,0), . . . , P(c, n−1)} (c=0, 1, . . . , n−1) are set, and $n^2$ lines L(c, r)={P(c) and P(i,(r+ci) mod n)} (i, c, r=0, 1, . . . , n−1) are set.

As a feature of the finite projective plane, $(n^2+n+1)$ points exist and the number of straight lines is $(n^2+n+1)$. Any two straight lines intersect at one point, and there is only one straight line connecting any two points. However, there is a constraint that n is a prime number.

Figure 46A:
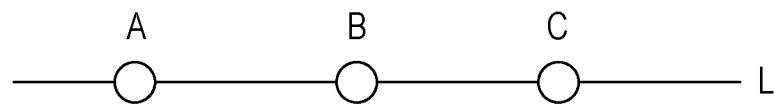
FIGS. 46A and 46B are diagrams illustrating the Latin square fat tree and the finite projective plane.
Figure 46B:
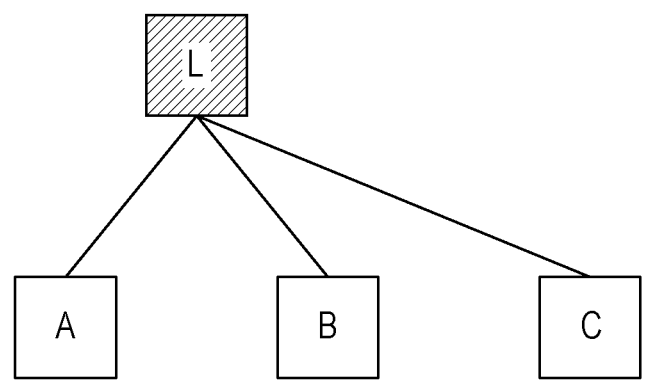

The structure of the finite projective plane is replaced by a topology structure. For example, the structure of the finite projective plane illustrated in FIG. 46A is replaced by the topology structure illustrated in FIG. 46B. In FIG. 46A, a straight line represents a Spine switch, and a point represents a Leaf switch. In FIG. 46B, a hatched rectangle represents a Spine switch, and a non-hatched rectangle represents a Leaf switch.

The topology structure illustrated in FIG. 47A is a topology structure of the Latin square fat tree with the number of Spine switches being 7 and the number of Leaf switches being 7, and corresponds to the structure of the finite projective plane illustrated in FIG. 47B. A topology structure of a portion surrounded by the bold line in FIG. 47A is the same as the topology structure of FIG. 46B. Also, a structure of a portion surrounded by the bold line in FIG. 47B corresponds to the topology structure of the portion surrounded by the bold line in FIG. 47A.

Figure 48:
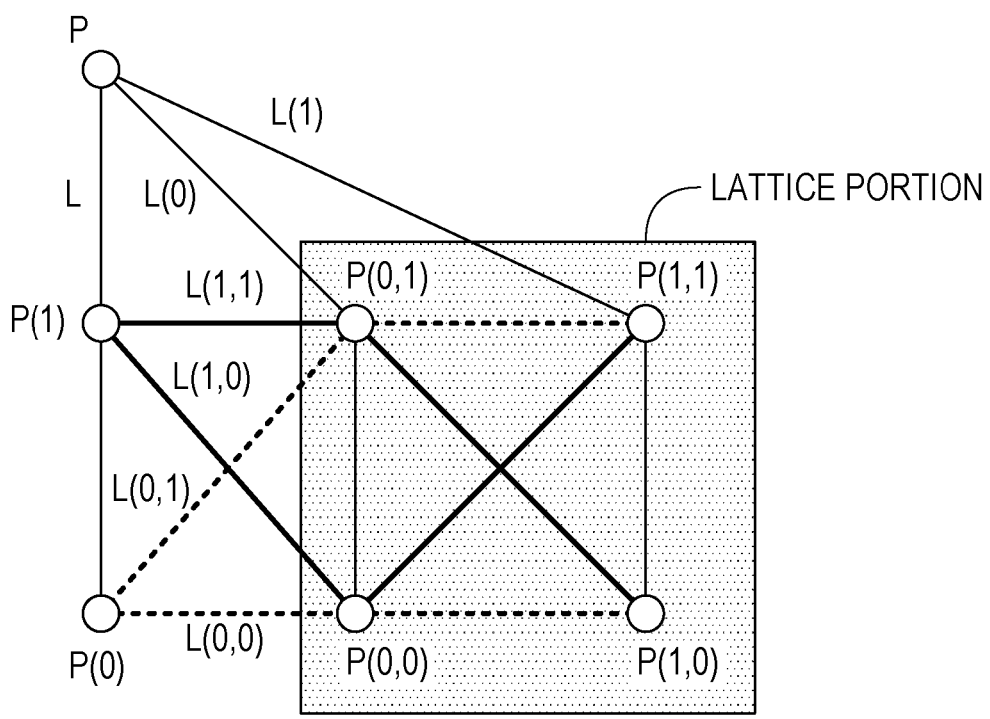
FIG. 48 is a diagram illustrating the Latin square fat tree and the finite projective plane.

The structure illustrated in FIG. 47B may be transformed into a structure illustrated in FIG. 48. In FIG. 48, 4 (=n*n) Leaf switches included in the hatched lattice portion correspond to four Leaf switches included in a portion surrounded by a frame 511 illustrated in FIG. 45. Parallel straight lines in the lattice portion are transformed to intersect at additional points. That is, straight lines having equal gradients are transformed to intersect each other.

Description of the Appendix is now complete.

The management apparatus 3 and the server described above are computer devices and as illustrated in FIG. 49, a memory 2501, a CPU 2503, an HDD 2505, a display control unit 2507 connected to a display device 2509, a drive device 2513 for a removable disk 2511, an input device 2515, and a communication control unit 2517 for connecting to a network are connected via a bus 2519 in the management apparatus 3 and the server. An operating system (OS) and an application program for executing processes in the embodiment are stored in the HDD 2505, and are read out from the HDD 2505 to the memory 2501 when executed by the CPU 2503. The CPU 2503 controls the display control unit 2507, the communication control unit 2517, and the drive device 2513 in accordance with the processing content of the application program to perform a predetermined operation. Data being processed is mainly stored in the memory 2501, but may also be stored in the HDD 2505. In the embodiments, the application program for carrying out the processes described above is stored in the computer readable removable disk 2511 and distributed, and is installed from the drive device 2513 to the HDD 2505. The application program may be installed in the HDD 2505 via a network such as the Internet and the communication control unit 2517. Such computer devices realize various functions as described above in such a way that hardware such as the CPU 2503 and the memory 2501 and the programs such as the OS and the application program organically cooperate with each other.

The Leaf switch and Spine switch described above, as illustrated in FIG. 50, may have a configuration in which a memory 2601, a CPU 2603, an HDD 2605, a display control unit 2607 connected to a display device 2609, a drive device 2613 for a removable disk 2611, an input device 2615, and communication control units 2617a to 2617c for connecting to a network are connected via a bus 2619. In some cases, the display control unit 2607, the display device 2609, the drive device 2613, and the input device 2615 may not be included in the Leaf switch and Spine switch. An operating system (OS) and an application program for executing processes in the embodiment are stored in the HDD 2605, and are read out from the HDD 2605 to the memory 2601 when executed by the CPU 2603. The CPU 2603 controls the display control unit 2607, the communication control unit 2617, and the drive unit 2613 to perform demanded operations, as demanded. Data input via any of the communication control units 2617a to 2617c is output via another communication control unit 2617. The CPU 2603 controls the communication control units 2617a to 2617c to appropriately switch an output destination. Data being processed is mainly stored in the memory 2601, but may be stored in the HDD 2605 as desirable. In the embodiment of the present disclosure, the application program for carrying out the processes described above is stored in the computer readable removable disk 2611 and distributed, and is installed from the drive device 2613 to the HDD 2605. The application program may be installed in the HDD 2605 via a network such as the Internet and the communication control unit 2617. Such a computer device realizes various functions as described above in such a way that hardware such as the CPU 2603 and the memory 2601 and the programs such as the OS and the application program organically cooperate with each other.

The embodiments described above may be summarized as follows.

An information processing system according to a first aspect of the embodiments includes a plurality of Spine switches, a plurality of Leaf switches, and a plurality of information processing apparatus respectively connected to any of a plurality of Leaf switches. The connection form between the plurality of Spine switches and the plurality of Leaf switches is a Latin square fat tree. Then, each of the information processing apparatuses connected to first Leaf switches, among the plurality of Leaf switches, which correspond to at least a portion of points other than points at infinity of the finite projective plane corresponding to the Latin square fat tree includes a first communication unit that performs first collective communication with other information processing apparatuses connected to the first Leaf switches on a route via a first Spine switch among the plurality of Spine switches and a second communication unit that performs second collective communication with other information processing apparatuses connected to the first Leaf switches on a route via a second Spine switch different from the first Spine switches among the plurality of Spine switches at each phase of the first collective communication.

It becomes possible to execute the first collective communication and the second collective communication in parallel using specific Leaf switches in the Latin square fat tree system. Also, because different Spine switches are used for the first collective communication and the second collective communication, it is possible to avoid occurrence of a route conflict.

Also, the first collective communication may be all-to-all communication and the second collective communication may be Allreduce communication.

Normally, the number of phases of all-to-all communication is larger than the number of phases of Allreduce communication. Accordingly, it is possible to execute Allreduce communication during execution of all-to-all communication.

The first collective communication and the second collective communication may be Allreduce communication, and the computation related to the first collective communication and the computation related to the second collective communication may be different.

When participating information processing apparatuses are the same, the number of phases is the same and thus, it is possible to execute certain Allreduce communication and another Allreduce communication in parallel.

The points corresponding to the first Leaf switches among the points of the finite projective plane are included in a rectangular area, and the number of rows and the number of columns of the rectangular area may be equal to or more than the number of information processing apparatuses connected to each of the first Leaf switches.

It is possible to efficiently use the Spine switches and to avoid communication exceeding an allowable range of the network corresponding to the rectangular area and thus, occurrence of a route conflict may be avoided.

The information processing system may further include a management apparatus. Then, the management apparatus may generate first communication information for performing the first collective communication on the route via the first Spine switch, identify a route via the second Spine switch from among the routes in the Latin square fat tree, generate second communication information for performing the second collective communication on a route via the second Spine switch at each phase of the first collective communication, and transmit the generated first communication information and second communication information to each of the information processing apparatuses connected to the first Leaf switches. Then, the first communication unit may perform the first collective communication according to the received first communication information and the second communication unit may perform the second collective communication according to the received second communication information.

The first collective communication and the second collective communication are appropriately performed as a whole.

A first information processing apparatus according to a second aspect of the embodiments is included in an information processing system including a plurality of Spine switches, a plurality of Leaf switches connected to the plurality of Spine switches in a connection form of a Latin square fat tree, and a plurality of information processing apparatuses respectively connected to any of the plurality of Leaf switches. The first information processing apparatus includes a first communication unit (second communication part 1013 (illustrated in FIG. 11) in the embodiments is an example of the first communication unit) that performs first collective communication, on a route via a first Spine switch among the plurality of Spine switches, with other information processing apparatuses connected to first Leaf switches, among the plurality of Leaf switches, which correspond to at least a portion of points other than points at infinity of the finite projective plane corresponding to the Latin square fat tree and are connected to the first information processing apparatus and a second communication unit (third communication part 1015 (illustrated in FIG. 11) in the embodiment is an example of the second communication unit) that performs the second collective communication, on a route via a second Spine switch different from the first Spine switch among the plurality of Spine switches, with other information processing apparatuses connected to the first Leaf switches at each phase of the first collective communication.

A program for causing a computer to perform the process according to the method described above may be created, and the program may be stored in a computer-readable storage medium such as a flexible disk, a CD-ROM, a magneto-optical disk, a semiconductor memory, a hard disk, or a storage device. An intermediate process result is generally temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
a plurality of Spine switches;
a plurality of Leaf switches coupled to the plurality of Spine switches in a form of a Latin square fat tree;
a plurality of information processing apparatuses each coupled to any one of the plurality of Leaf switches and including a first processor configured to:
perform, in a case where the first processor is included in one of first information processing apparatuses coupled to one of first Leaf switches among the plurality of Leaf switches, first collective communication with others of the first information processing apparatuses on a route via a first Spine switch of the plurality of Spine switches, the first Leaf switches corresponding to at least a portion of points other than points at infinity of a finite projective plane corresponding to the Latin square fat tree; and
perform, in a case where the first processor is included in the one of the first information processing apparatuses, second collective communication with others of the first information processing apparatuses on a route via a second Spine switch of the plurality of Spine switches at each phase of the first collective communication, the second Spine switch being different from the first Spine switch; and
a management apparatus including a second processor configured to:
generate first communication information for performing the first collective communication on the route via the first Spine switch;
identify a route via the second Spine switch from among routes in the Latin square fat tree;
generate second communication information for performing the second collective communication on a route via the second Spine switch at each phase of the first collective communication; and
transmit the generated first communication information and second communication information to each of the first information processing apparatuses.

2. The information processing system according to claim 1, wherein the first collective communication is all-to-all communication and the second collective communication is Allreduce communication, the all-to-all communication being communication in which each member of the all-to-all communication transmits data to all of other members of the all-to-all communication and receives data from all of the other members of the all-to-all communication, the Allreduce communication being communication for all members of the Allreduce communication to have a result of computation executed using data held by all members of the Allreduce communication.

3. The information processing system according to claim 1, wherein
the first collective communication and the second collective communication are Allreduce communication, the Allreduce communication being communication for all members of the Allreduce communication to have a result of computation executed using data held by all members of the Allreduce communication, and
computation related to the first collective communication and computation related to the second collective communication are different.

4. The information processing system according to claim 1, wherein points corresponding to the first Leaf switches among the points of the finite projective plane are included in a rectangular area, and a number of rows and a number of columns of the rectangular area are respectively equal to or larger than a number of information processing apparatuses coupled to each of the first Leaf switches.

5. The information processing system according to claim 1,
wherein the first processor is further configured to:
perform the first collective communication in accordance with the received first communication information; and
perform the second collective communication in accordance with the received second communication information.

6. A first information processing apparatus of a plurality of information processing apparatuses coupled to any one of a plurality of Leaf switches coupled to a plurality of Spine switches in a form of a Latin square fat tree, the first information processing apparatus comprising:
- a memory;
- a first processor coupled to the memory and the first processor configured to:
  - perform, in a case where the first processor is included in one of first information processing apparatuses coupled to one of first Leaf switches among the plurality of Leaf switches, first collective communication with others of the first information processing apparatuses on a route via a first Spine switch of the plurality of Spine switches, the first Leaf switches corresponding to at least a portion of points other than points at infinity of a finite projective plane corresponding to the Latin square fat tree; and
  - perform, in a case where the first processor is included in the one of the first information processing apparatuses, second collective communication with others of the first information processing apparatuses on a route via a second Spine switch of the plurality of Spine switches at each phase of the first collective communication, the second Spine switch being different from the first Spine switch; and
- a management apparatus including a second processor configured to:
  - generate first communication information for performing the first collective communication on the route via the first Spine switch;
  - identify a route via the second Spine switch from among routes in the Latin square fat tree;
  - generate second communication information for performing the second collective communication on a route via the second Spine switch at each phase of the first collective communication; and
  - transmit the generated first communication information and second communication information to each of the first information processing apparatuses.

7. An information processing method, comprising:
performing, in a case where a first processor is included in one of first information processing apparatuses coupled to one of first Leaf switches among a plurality of Leaf switches, first collective communication with others of the first information processing apparatuses on a route via a first Spine switch of a plurality of Spine switches in a form of a Latin square fat tree, the first Leaf switches corresponding to at least a portion of points other than points at infinity of a finite projective plane corresponding to the Latin square fat tree;
performing, in a case where the first processor is included in the one of the first information processing apparatuses, second collective communication with others of the first information processing apparatuses on a route via a second Spine switch of the plurality of Spine switches at each phase of the first collective communication, the second Spine switch being different from the first Spine switch;
generating first communication information for performing the first collective communication on the route via the first Spine switch;
identifying a route via the second Spine switch from among routes in the Latin square fat tree;
generating second communication information for performing the second collective communication on a route via the second Spine switch at each phase of the first collective communication; and
transmitting the generated first communication information and second communication information to each of the first information processing apparatuses.

8. The information processing method of claim 7, further comprising controlling a phase of the collective communication.

9. The information processing method of claim 7, wherein the information includes a connection relationship among a plurality of Spine switches, a plurality of Leaf switches, and the information processing apparatus.

10. The information processing method of claim 9, wherein a first Leaf switch of the plurality of Leaf switches corresponds to at least a portion of points other than points at infinity of a finite projective plane corresponding to the Latin square fat tree.

11. The information processing method of claim 7, wherein the collective communication includes all-to-all communication.

12. The information processing method of claim 7, wherein the collective communication includes Allreduce communication.

* * * * *